United States Patent
Liao et al.

(10) Patent No.: US 8,242,958 B2
(45) Date of Patent: Aug. 14, 2012

(54) SYSTEM AND METHOD FOR POSITIONING USING SIGNAL TRANSMIT POWER AND SIGNAL RECEIVE PACKET ERROR RATIO

(75) Inventors: Jason Y. Liao, Sichuan (CN); Changzheng Sun, Xi'an (CN)

(73) Assignee: Westvalley Digital Technologies, Inc., Chengdu, Sichuan (CN)

( * ) Notice: Subject to any disclaimer, the term of this patent is extended or adjusted under 35 U.S.C. 154(b) by 0 days.

(21) Appl. No.: 13/176,425

(22) Filed: Jul. 5, 2011

(65) Prior Publication Data

US 2011/0260923 A1 Oct. 27, 2011

Related U.S. Application Data

(63) Continuation of application No. PCT/CN2010/070041, filed on Jan. 6, 2010.

(30) Foreign Application Priority Data

Jan. 6, 2009 (CN) .......................... 2009 1 0058045

(51) Int. Cl.
*G01S 3/02* (2006.01)
(52) U.S. Cl. ....................................................... 342/458
(58) Field of Classification Search .................. 342/458, 342/463–465
See application file for complete search history.

(56) References Cited

U.S. PATENT DOCUMENTS

| | | | |
|---|---|---|---|
| 2003/0143956 A1 | 7/2003 | Taylor | |
| 2008/0165058 A1* | 7/2008 | Ayachitula et al. | 342/463 |
| 2009/0051547 A1* | 2/2009 | McFarland | 340/573.3 |
| 2010/0201573 A1* | 8/2010 | Lamming | 342/451 |

FOREIGN PATENT DOCUMENTS

| | | | |
|---|---|---|---|
| CN | 1924609 A | | 3/2007 |
| CN | 101114019 A | | 1/2008 |
| CN | 101131432 A | | 2/2008 |
| CN | 101335956 A | * | 12/2008 |
| JP | 2008232907 A | | 10/2008 |
| WO | WO 2007/130746 A2 | * | 11/2007 |

OTHER PUBLICATIONS

Intermittent, The Penguin English Dictionary, 2007. Retrieved from http://www.credoreference.com/entry/penguineng/intermittent.*

(Continued)

*Primary Examiner* — Jack W Keith
*Assistant Examiner* — Fred H Mull
(74) *Attorney, Agent, or Firm* — Tim Tingkang Xia; Morris, Manning & Martin, LLP

(57) ABSTRACT

A system and method for positioning using signal transmit power, SNR of the signal receiving unit, signal receive PER or PLR, and distance relationship between the signal source and receiving unit. The system includes a ranging signal transmitting unit and receiving unit. The transmitting unit continuously transmits a fixed number of ranging signal packets using different transmit powers, and the receiving unit receives the ranging signal packets, collect statistics for the PLR at each transmit power, and calculates the distance between the transmitting unit and itself using the distance relationship. The present invention uses the reference signal source and the method for calculating relative distance to reduce the impact from the noise and environment changes on the positioning, and introduces the critical transmit power to further enhance positioning precision. With the method provided in the present invention, using a common active RFID tag achieves high precision and effective positioning.

16 Claims, 12 Drawing Sheets

OTHER PUBLICATIONS

English translation of CN 101335956 A.*

English translation of Xi'an.*

Xi'an Saycool, Brief Introduction of the Innovative Technology about the 2.4G Over-long Rang and Low-Energy-Consumption Active RFID of Saycool, Sep. 15, 2009.

Yang, Tianrong, Active RFID, China Electrical Market (Radio Frequency Identification Technologies and Applications), Feb. 2008, No. 1, pp. 36-39.

Yan, Yan et al, Design and Application of Active Radio Frequency Identification System, Computer Engineering, Jun. 2008, vol. 34 No. 11, pp. 234-236.

* cited by examiner

SYSTEM AND METHOD FOR POSITIONING USING SIGNAL TRANSMIT POWER AND SIGNAL RECEIVE PACKET ERROR RATIO

CROSS-REFERENCE TO RELATED APPLICATIONS

This application is a continuation of International Patent Application No. PCT/CN2010/070041, with an international filing date of Jan. 6, 2010, designating the United States, now pending, which is based on Chinese Patent Application No. 200910058045.3, filed on Jan. 6, 2009. The contents of these specifications are incorporated herein by reference.

BACKGROUND OF THE INVENTION

1. Field of the Invention

The present invention relates to radio frequency technologies, and in particular, to a system and method for positioning using signal transmit power and signal receive packet error rate (PER).

2. Description of the Related Art

The conventional radio frequency positioning technologies, besides commonly used global positioning system (GPS), include radar positioning, radio directional positioning, received signal strength indication (RSSI) positioning, radio frequency signal, time of arrival (TOA), and time difference of arrival (TDOA) positioning.

The GPS first needs a GPS satellite receiving terminal for receiving signals from satellites. After calculating the longitude and latitude of a position, the GPS receiving terminal transmits the data to the positioning management center over the mobile communication network, and displays the position on the electronic map. Obviously, the GPS receiving terminal and mobile communication terminal are costly, large, and energy-consuming, which is not suitable for low cost applications. In addition, the GPS is not in full play in a downtown area with a high density of buildings, inside the buildings, and underground mine.

A radar positioning system uses radars to transmit signals along different directions, and determine the position of the search target by analyzing signals returned from the search target. A typical example is using military radars to search for the enemy plane. This is not suitable for positioning applications requiring low cost because the devices are expensive and large in size.

Conventionally, for victims in distress occurred on land or on the sea, radars are conditionally used for positioning the big ship in distress and important shipwreck. In case of common small ships without GPS and marine satellite communication devices, or connectionless ships, drowning victims, victims in field distress on land, rescue ships or helicopters are usually used to search for victims by naked eyes. This is very difficult in rescuing, especially in frog and the night with a low visibility.

The radio directional positioning system requires that a simple radio signal generating apparatus be arranged in the search target for intermittently transmitting signals. The searcher needs to determine the position of the signal source using the directional antenna and intercepting device so as to determine the position of the search target according to the signal strength. This method is simple, but is not accurate.

As the development of technology, currently most micro-power transceivers using a single chip support the received signal strength indication (RSSI) function. Therefore, the position of a moving target can be determined based on the obtained signal strength, which has become a most-researched positioning method. This method is simple and requires no additional hardware. However, the RSSI produces a great error in signal strength test and there are many factors affecting the test. Therefore, such signal strength test is far from accurate, especially in small-scale and short-distance positioning.

In addition, the conventional simple positioning technology (see related documents for accurate positioning using the active RFID tag in IEEE and ISO-RTLS international standards ISO/IEC24730-2), positioning is usually achieved by analyzing the received active RFID tag signals. To save energy and reduce the cost, most active radio frequency identification (RFID) tags work at a predetermined transmit power to periodically transmit signals at a predetermined interval. The same RFID tag works in a variety of environments, large or small and with different open spaces. Therefore, if the RFID tag cannot adjust its transmit power according to the working environment to prevent impacts caused by signal blockage and reflection, but transmits signals at the predetermined transmit power. This affects the positioning.

The positioning is achieved by measuring the TOA between the search target and radio frequency signals to the intercepting receiver. Because there is a high requirement on time synchronization between the signal source and signal receiver, this method is not practical. As regards the positioning by measuring the TDOA between the signal source and signal receiver in case of different signals (radio frequency signal and ultrasonic signal), the cost is increased because two different signals are required. That is, two types of signal transmitting devices and receiving devices are required, such as ultrasonic generating device and receiving device. In addition, with this method, the positioning accuracy is closely related to the precision in time difference test, which increases its application complexity and hinders its application.

Although ensuring safety in the underground mine and rescuing the victims in distress are two top issues for safe production in underground mine, only the area where the workers in the underground mine can be determined, far from accurate positioning. Accordingly, in the event of an accident, the victims cannot be accurately positioned, which increases complexity of the rescue work. Therefore, accurately positioning the workers trapped in the underground mine is a critical problem to be solved. In the search and rescue in 5.12 Wenchuan Earthquake, since the position of the trapped plane is difficult to be determined, a large amount of manpower, material resources, and time are used for rescue. This reflects the situation of the current long-distance search and rescue.

To sum up, the conventional positioning technology encounters problems such as high cost, weak practicality, and low positioning precision. Therefore, an economic, precise, simple but efficient positioning technology is desired.

SUMMARY OF THE INVENTION

The present invention is directed to providing an economic and practical positioning system and method with a high precision by taking advantages of low cost and simple structure of the RFID.

One embodiment of the present invention provides a system for positioning using an active RFID tag. The system includes a ranging signal collecting unit, configured to collect ranging signals from a ranging signal transmitting unit, the ranging signal transmitting unit being configured to continuously and repeatedly transmit a predetermined number of ranging signal packets; a packet loss rate (PLR) calculating unit, configured to calculate the PLR of the ranging signals according to the number of received ranging signal packets received by the ranging signal collecting unit and the predicted number of data packets transmitted by an active RFID tag within a predetermined time period; and a position determining unit, configured to determine, based on a predetermined policy, the distance between the ranging signal transmitting unit and the ranging signal collecting unit according to the PLR and transmit power of the ranging signals. It should be noted that the active RFID tag may also be a common radio signal transceiver device. The active RFID tag differs from the common radio signal transceiver device in that it is mainly used for identification and positioning. Therefore, the active RFID tag needs to be cost efficient and small in size for easy carrying. In addition, for the purpose of energy saving, it needs to work in intermittent mode to reduce the duty cycle.

The ranging signal transmitting unit is an active RFID tag working in intermittent mode in an active RFID tag system, and the ranging signal collecting unit is an active RFID reader; or the active RFID tag is the ranging signal collecting unit, and the active RFID reader is the ranging signal transmitting unit.

The ranging signal collecting unit includes a transceiver unit, configured to receive the ranging signals; and a control and storage statistical unit, configured to control receiving of the transceiver unit and collect statistics for and store the received data.

The predetermined policy is ln x=[ln q−G(Er)−b(N)]/n, where x is the distance between the active RFID tag or another ranging signal transmitting unit and the transceiver unit, q is the transmit power of the ranging signals, Er is the PLR corresponding to the transmit power q of the ranging signals, and n is an environment attenuation index determined in advance or based on experience; b(N)=ln (N/A), where N is the ambient noise strength, and A is signal transmission efficiency parameter of the active RFID tag or the another ranging signal transmitting unit; and G(Er)=ln g(Er), where g(Er) is signal to noise ratio (SNR) of the strength of ranging signals received by the transceiver unit to the ambient noise strength, which is determined according to the mapping between Er and g(Er).

Optionally, the system may include M transceiver units, M being 2 or 3, and the predetermined policy is as follows:

$$x_1/x_2 = [q_1 g(Er_2)/q_2 g(Er_1)]^{1/n}$$

where M=2, corresponding transceiver units are a first transceiver unit and a second transceiver unit, $x_1$ and $x_2$ are the distances between the active RFID tag or another ranging signal transmitting unit and the first, and second transceiver units with a predetermined position respectively, n is the predetermined environment attenuation index, $Er_1$ and $Er_2$ are respectively the PLRs of the ranging signals at the first and second transceiver unit relative to the transmit powers $q_1$ and $q_2$ corresponding to the active RFID tag or another ranging signal transmitting unit, and $g(Er_1)$ and $g(Er_2)$ are determined according to the mapping between the predetermined Er and g(Er).

$$x_1/x_2/x_3 = [(q_1 g(Er_2) g(Er_3))/(q_2 g(Er_1) g(Er_3))/(q_3 g(Er_1) g(Er_2))]^{1/n}$$

where M=3, corresponding transceiver units are a first transceiver unit, a second transceiver unit, and a third transceiver unit, $x_1$, $x_2$ and $x_3$ are the distances between the active RFID tag or another ranging signal transmitting unit and the first, second, and third transceiver units with a predetermined position respectively, n is the predetermined environment attenuation index, $Er_1$, $Er_2$, and $Er_3$ are respectively the PLRs of the ranging signals at the first, second, and third transceiver units relative to the transmit powers $q_1$, $q_2$, and $q_3$ corresponding to the active RFID tag or another ranging signal transmitting unit, and $g(Er_1)$, $g(Er_2)$, and $g(Er_3)$ re determined according to the mapping between the predetermined Er and g(Er).

One embodiment of the present invention provides a method for positioning using an active RFID tag. The method includes: collecting, by a ranging signal collecting unit, ranging signals from an active RFID tag; calculating, by a PLR calculating unit, the PLR of the ranging signals according to the number of received ranging signal packets received by the ranging signal collecting unit and the predicted number of data packets transmitted by an active RFID tag within a predetermined time period; and determining based on a predetermined policy, by a position determining unit, position of the active RFID tag according to the PLR and transmit power of the ranging signals. It should be noted that similar to the positioning system, the active RFID tag may also be a common radio signal transceiver device.

According to embodiments of the present invention, the method and system for positioning use low-cost and micropower consumption active RFID tag and transceiver unit. With the method and system, high-precision positioning for a moving target can be simply achieved without adding any device. The maximum positioning errors indoor and outdoor are all less than 10% of the positioning range. This not only solves the problem of how to accurately position the search target in the search and rescue on land, on the sea, and in underground mine, which is practical. Meanwhile, the present invention also provides a new, economic, simple but efficient positioning method for other positioning applications.

BRIEF DESCRIPTION OF THE DRAWINGS

Detailed description is given below in junction with accompanying drawings, in which.

DETAILED DESCRIPTION OF THE EMBODIMENTS

Various embodiments of the present invention provide a system and method for positioning using an active RFID tag. The following section describes the technical solution of the present invention in combination with accompanying drawings and embodiments.

Before the description of the technical solution in combination with embodiments, the working principle of the system for positioning using the active RFID tag is described in detail first.

Figure 1:
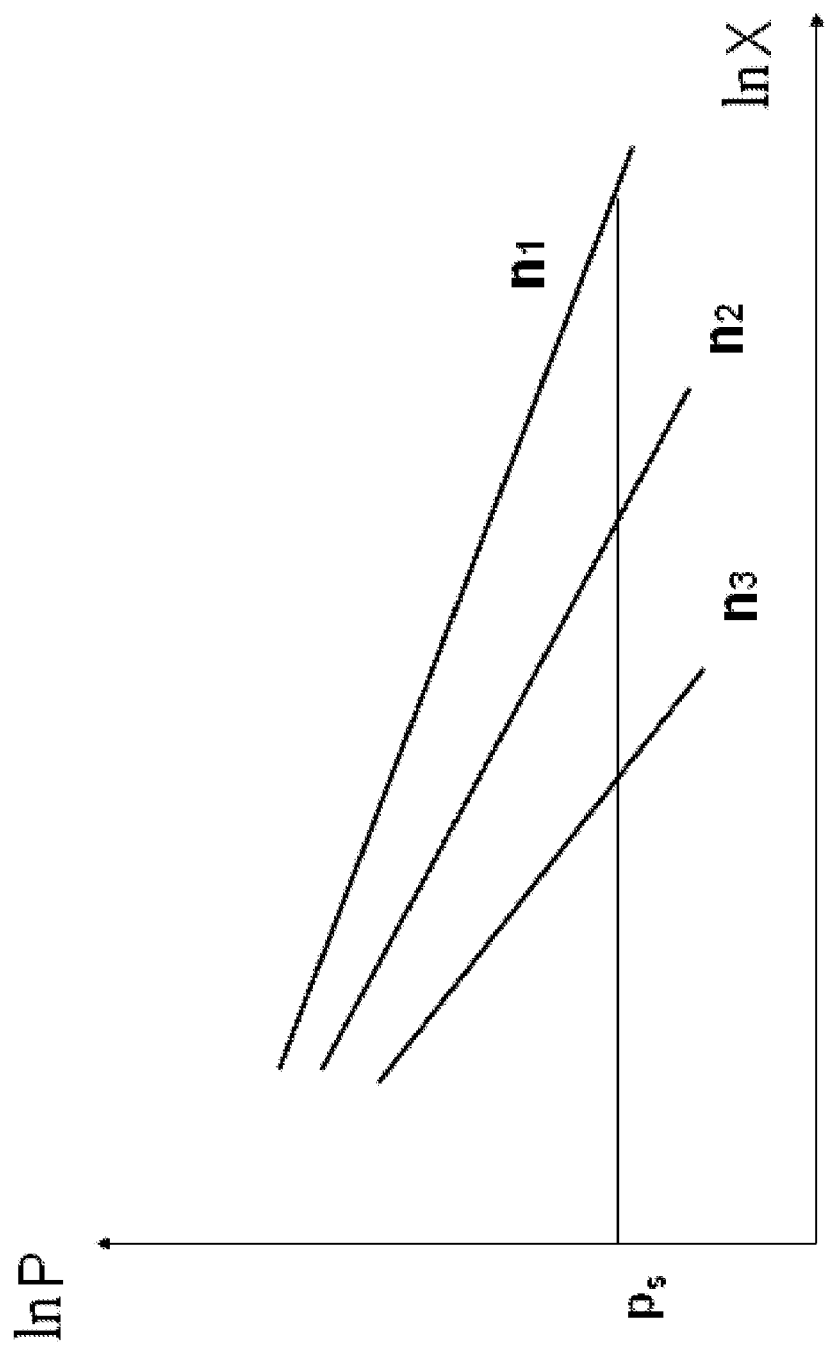
FIG. 1 is a schematic view showing an approximate relationship between signal strength P, transmission environment attenuation index n, and transmission distance X when an active RFID tag transmits signals at a given transmit power.

It should be known that in a spacious space, the strength of radio frequency signals transmitted from any given signal source may be simply represented by an exponent formula:

$$p = Aqx^{-n},$$

where p is the strength of the signals received by a signal receiver with a distance of x from the signal source; q is the transmit power at the signal source; A is the efficiency parameter at the signal source, a constant only related to the transmission feature at the signal source and related to the antenna gain; n is the environment attenuation index indicating how much the transmission environment affects the signal attenuation, n being 2 in an ideal environment, and n ranging from 2 to 4 in normal cases. Referring to FIG. 1, it is obviously a monotone function. Under the same signal strength, the greater the environment attenuation index, the shorter the distance between the receiver and the signal source. From FIG. 1, $n_3 > n_2 > n_1$. Theoretically, when the signal strength at the signal receiver is greater than the receiver flexibility ps of the signal receiver, the receiver can receive the signal. In such a case, the distance between the signal receiver and the signal source is the communication distance therebetween. In practice, due to factors such as interior and exterior noise interferences from the signal receiver, the signal receiver produces bit errors during signal receiving. Under other given conditions, the SNR at the signal receiver P/N=SNR (p is the signal strength at the signal receiver, and n is the noise strength) determines the PER Er. The greater the SNR is, the smaller the PER is. Therefore, the PER is in a monotonic relationship with the SNR. The relationship between the SNR and PER can be embodied in the formula Er=f(SNR) or SNR=g(Er) in case of a given signal receiver at given conditions (for example, modulation mode, coding mode, and channel). f(SNR) is an inverse function of g(Er). These two functions are only related to the signal receiver feature and communication mode, do not vary with the environment, and can be tested in a lab or site in advance. The SNR and Er are in one-to-one relationship. If the noise strength N is given, the SNR is in one-to-one relationship with the signal strength p. Therefore, Er is in one-to-one relationship with the signal strength p.

For convenient of the actual application, the PER Er used in the present invention is defined to the ratio of the difference (number of lost packets) between the number of signal packets received by the signal receiver and the total number of signal packets to the total number of signal packets sent from the signal source, that is, the PLR. The PER is calculated by calculating the PLR during packet receiving.

In a given transmission environment, the environment attenuation index n may be assumed to a constant.

As regards the given source (for example, active RFID tag), signal receiver (for example, active RFID reader), and given signal transmission feature:

The average PER in packet received by the signal receiver is only related to the signal strength and ambient noise (SNR). That is, Er=f(p/N), where Er is in a monotonic relationship with p/N.

According to the preceding formula: $p=Aqx^{-n}$, p/N=SNR, SNR=g(Er). The following formulas can be derived:

$$p/N = Aqx^{-n}/N = SNR = g(Er)$$

$$\ln(p/N) = \ln q^{-n} \times \ln x - \ln(N/A)$$

$$\ln q = n \times \ln x + \ln(p/N) + \ln(N/A)$$

$$\ln q = n \times \ln x + \ln g(Er) + \ln(N/A)$$

$$\ln q = n \times \ln x + G(Er) + b(N),$$

where, G(Er)=ln g(Er), b(N)=ln(N/A), and therefore $$\ln x = [\ln q - G(Er) - b(N)]/n$$

In the preceding formulas, the relationship between the signal strength q at the signal source and the distance x from the signal source and the signal receiver is given, where n is the environment attenuation index only related to the transmission environment but not related to the ambient noise. The formula b(N)=ln(N/A) is a factor affecting the efficient parameter of the signal transmitter at the signal source and the ambient noise strength, and its value is only related to the working feature of the signal transmitter and the ambient noise. b(N) can be tested on-site. In addition, the ambient noise is not a constant value, which varies with the time and change of the noise source. Since the noise strength is inversely proportional to the square of the noise transmission distance, a remote noise source cause a small impact on the variation of ambient noise within a limited positioning range. If there are no other noise sources, it may be considered that the ambient noise only varies with the time and not the location within this limited positioning range. Therefore, the noise varying with the time may affect the value of b(N). G(Er) is a factor affecting the working feature of the signal transmitter having a signal source and the communication mode, which is not related to other factors. The detailed reason is described in the following section.

Figure 2:
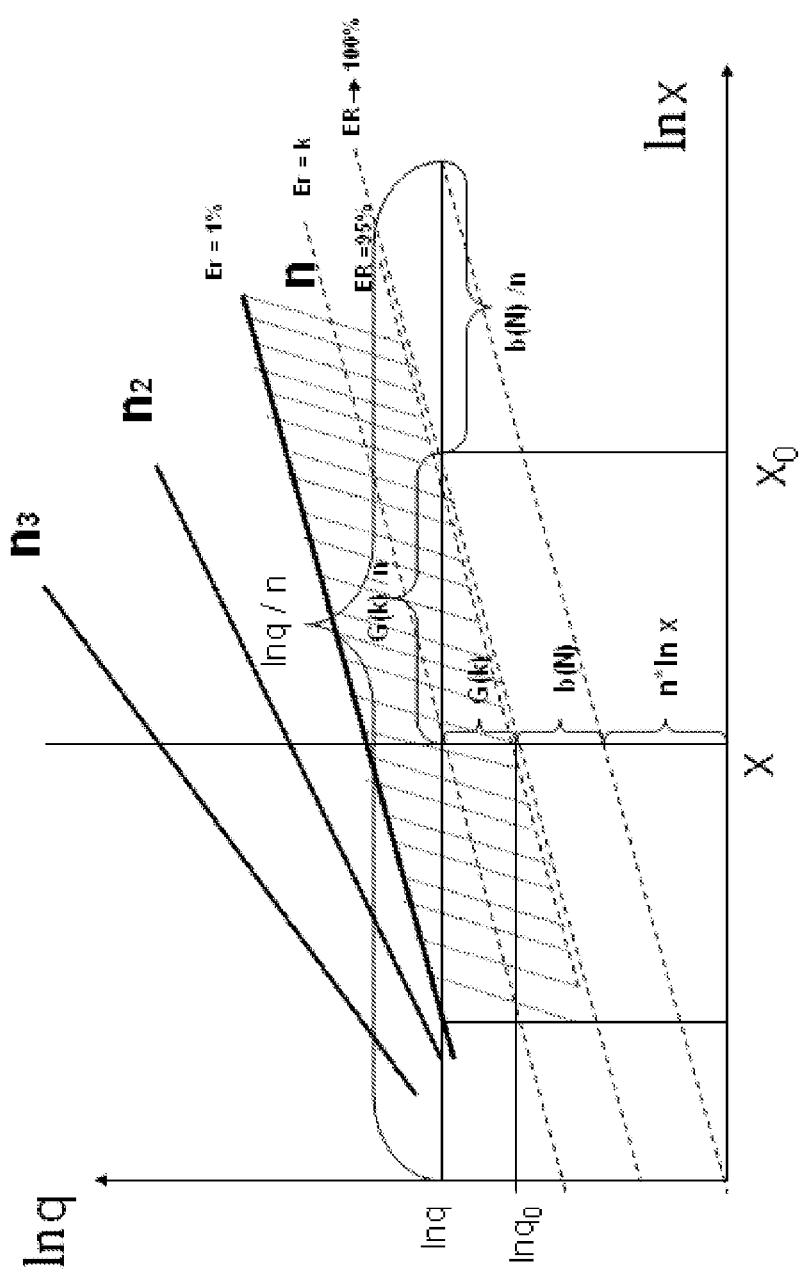
FIG. 2 is a schematic view showing an approximate relationship between the PLR Er, transmit power q, communication distance x, environment attenuation index n, and ambient noise of the active RFID tag.

A variant of the preceding formula is ln q=n ln x+G(Er)+b(N), which indicates the relationship between the transmit power q, transmission environment attenuation index n, noise strength N, PER Er, and communication distance of a signal transmitter. Referring to FIG. 2, in a given transmission environment, the value of n is given. In this case, different PERs are represented by different straight parallel lines, forming a zonal area with a slope of n. The environment attenuation index n determines only the slope of the straight line in the logarithmic coordinator. The change of the PER and average noise strength is equivalent to one-unit translation of the original straight line along the vertical direction q and horizontal direction (x).

For the given active RFID tag and active RFID reader, n, g(Er), and b(N) can be determined by actual test on-site, by using experimental formulas, or by combining experience and actually tested data. It should be noted that different ambient noises N correspond to different b(N) values. With the actually n, b(N), and g(Rr) in the actual test environment, the distance x between the signal source and signal receiver can be calculated by using the actually tested Er and the queried transmit power q of the ranging signal corresponding to Er so as to implement positioning of the active RFID tag. It should be noted that in the formula ln q=n ln x+G(Er)+b(N), b(N) is related to the ambient noise, and therefore, in the practice of positioning, the ambient noise value actually tested on-site needs for calculation. While being used to test the signal PER, the signal receiver is to test the ambient noise N to calculate the new value of b(N); or a correction is made to b(N) by using the reference signal source.

The following section describes determination of values of n, g(Er), and b(N) in the test environment.

The value of n can be determined as follows:

According to the formula $g(Er)=Aqx^{-n}/N$, a test is performed using different transmit powers $x_1$ and $x_2$.

If $Er_1=Er_2$, $Aq_1x_1^{-n}/N=Aq_2x_2^{-n}/N$, it can be derived that $n=(\ln q_2-\ln q_1)/(\ln x_2-\ln x_1)=\ln(q_2/q_1)/\ln(x_2/x_1)$.

Because $x_2$, $x_1$, $q_2$, and $q_1$ are given, the value of n can be calculated.

As regards determination of value of b(N), since A is a constant unrelated to the ambient noise and environment attenuation but only related to the transmission feature of the signal source, the value of b(N) can be determined using the formula $p=Aqx^{-n}$ in an anechoic chamber without noise. During the test, a method similar to the preceding one can be used to calculate the value of n in the anechoic chamber environment, and the value of A is calculated by changing the transmit power q and measuring different signal strength p at the signal source x.

If the value of A is obtained, the value of b(N) can be obtained by measuring the ambient noise value in each positioning.

In addition, other methods can be used to calculate the value of A.

The simplest method for determining the function g(Er) is testing in the lab. To be specific, using the same signal receiver that is used for onsite test, communication channel, and signal modulation coding mode, the function can be determined by measuring the PERs corresponding to different SNR p/N. In addition, other methods can be used to determine this function.

It should be noted that, different from n, A, and g(Er), the value of b(N) is affected by the ambient noise. b(N) varies with the ambient noise. Therefore, during the test of the position of the target, while being used to test the signal PER, the signal receiver is to test the ambient noise N to test the value of N; or a correction is made to N by using the reference signal source.

Or the value of b(N) is corrected during actual test by using the reference signal source to eliminate or reduce the impact caused by the ambient noise. The correction method is as follows: at a given position, for example, position that is x0 away from the signal receiver, the PER Er of the ranging signals sent from the reference signal source is tested by the signal receiver by using the reference signal source so as to determine the value of G(Er); the transmit power q of the ranging signals corresponding to Er is also obtained by querying the pre-stored information about the transmit power of the ranging signals sent by the reference signal source; n is a tested value; accordingly, the value of b(Nnew) can be calculated using the formula $b(N)=\ln q^{-n}\times\ln x-G(Er)$.

The distance from the active RFID tag to the active RFID reader can be calculated using the formula $\ln x=\{\ln q-\ln g(Er)-b(Nnew)\}/n$ according to the transmit power of the target to be tested for actual positioning (for example, active RFID tag), the PER Er of signals received by the signal receiver (for example, RFID reader), and the tested n, ln g(Er), and b(Nnew).

As regards the preceding transmission regularity of the radio frequency signals, in the actual transmission, the test using a single signal receiver usually produces a great deviation. However, multiple repeated tests can fully reflect the preceding transmission regularity, which is also the theory basis of the technical solution provided in the present invention.

In many application scenarios, the target can be positioned by measuring the relative distance between the signal source (target) and signal receivers (for example, signal receivers 1, 2, and 3) whose positions are known. Measuring the relative distance can overcome factors affecting the positioning, such as the ambient noise N and signal transmitter feature parameter A. For example, the position of the target can be determined by measuring the relative distances between the target and the three signal receivers on the plane respectively.

The following formulas can be derived from the formula $\ln x=[\ln q-G(Er)-b(N)]/n$:

$$\ln(x_1/x_2)=[\ln q_1-\ln(p_1/N)]/n-[\ln q_2-\ln(p_2/N)]/n$$

$$\ln(x_1/x_2)=[(\ln q_1-\ln q_2)+\ln(p_2/N)-\ln(p_1/N)]/n$$

$$\ln(x_1/x_2)=\{\ln(q_1/q_2)+\ln[(p_2/N)/(p_1/N)]\}/n$$

$$\ln(x_1/x_2)=[\ln(q_1/q_2)+\ln(p_2/p_1)]/n$$

$$x_1/x_2=[(q_1p_2)/(q_2p_1)]^{1/n}$$

In the preceding formulas, $x_1$ and $x_2$ are respectively the distances between the signal source and the two signal transceiver units 1 and 2 whose positions are known, $q_1$ and $q_2$ are respectively the transmit powers of the ranging signals sent from the signal source, $p_1$ and $p_2$ are respectively the signal strengths when the ranging signals are transmitted and when they are received at the signal receiver, and n is the environment attenuation index.

$$SNR=p/N=g(Er)$$

As regards a given signal receiver, in any noise environment, the function relationships between Er and G(Er) obtained in the lab and on-site are the same; under the condition that the ambient noise is given, the PER is only related to the signal strength. If the signal strength is greater than the noise strength, signals can be received; otherwise, no signal can be received. The signal strength is in a monotonic relationship with the PER.

If two signal receivers are used to test the same target, then $p_2/p_1=g(Er_2)/g(Er_1)$.

When multiple signal receivers are used and the target is positioned by collecting signals sent by the target at the same time period, the relative distances between the target and the multiple signal receivers and the known distances between the multiple signal receivers are used to calculate the position of the moving target. This prevents the impact caused by the ambient noise or other system errors.

The relative distances between the signal source and the signal receivers 1 and 2 can be calculated using the preceding formula as follows:

$$x_1/x_2=[(q_1g(Er_2))/(q_2g(Er_1))]^{1/n}$$

In many application scenarios, the relative distance between multiple RFID tags and the same receiving unit rather than the accurate distance between the RFID tag and the RFID reader is needed. For example, in the application where the RFID tag is used to implement automatic charging and management, the charging system needs to distinguish the vehicle before and the following vehicle when multiple vehicles are coming to the toll gate. In such a case, the signal receivers 1 and 2 need to combine into one signal receiver, and meanwhile all RFID tags use the same signal transmit power when this formula is used to calculate the relative distance. In this manner, the near vehicle and the following vehicle can be distinguished according to the PLR. Similarly, in the case where three signal receivers are used for test of the same target, the relative distances between the signal source and signal receivers 1, 2, and 3 are as follows:

$$x_1/x_2=[(q_1g(Er_2))/(q_2g(Er_1))]^{1/n}$$

$$x_2/x_3=[(q_2g(Er_3))/(q_3g(Er_2))]^{1/n}$$

$$x_1/x_2/x_3=[(q_1g(Er_2)g(Er_3))/(q_2g(Er_1)g(Er_3))/(q_3g(Er_1)g(Er_2))]^{1/n}$$

It should be noted that when two or more than two signal receivers are used to receive signals, these signal receivers have the same or similar feature.

It can be seen from the preceding formulas that the ratio of distances between the target to be positioned and the three signal receivers can be directly calculated according to the powers of the three signal receivers and the corresponding PERs, without using the reference signal source; and the position of the target can be determined according to the positions of the three signal receivers.

As regards the PLR Er, it should be noted that corresponding to the transmit power at each signal source, a signal receiving transition area or unstable area is formed near a position where the signal strength exceeds the receiver flexibility of the signal receiver. In this area, the signal receiver PER decreases with the increase of the distance, a sharp decrease from 100% to 0% (see FIGS. 3 and 4). This area is also called a critical transition area as regards the transmit power at the signal source and the signal receiver. The transmit power corresponding middle value of the PER range 1%-99% is called the critical transmit power.

Figure 3:
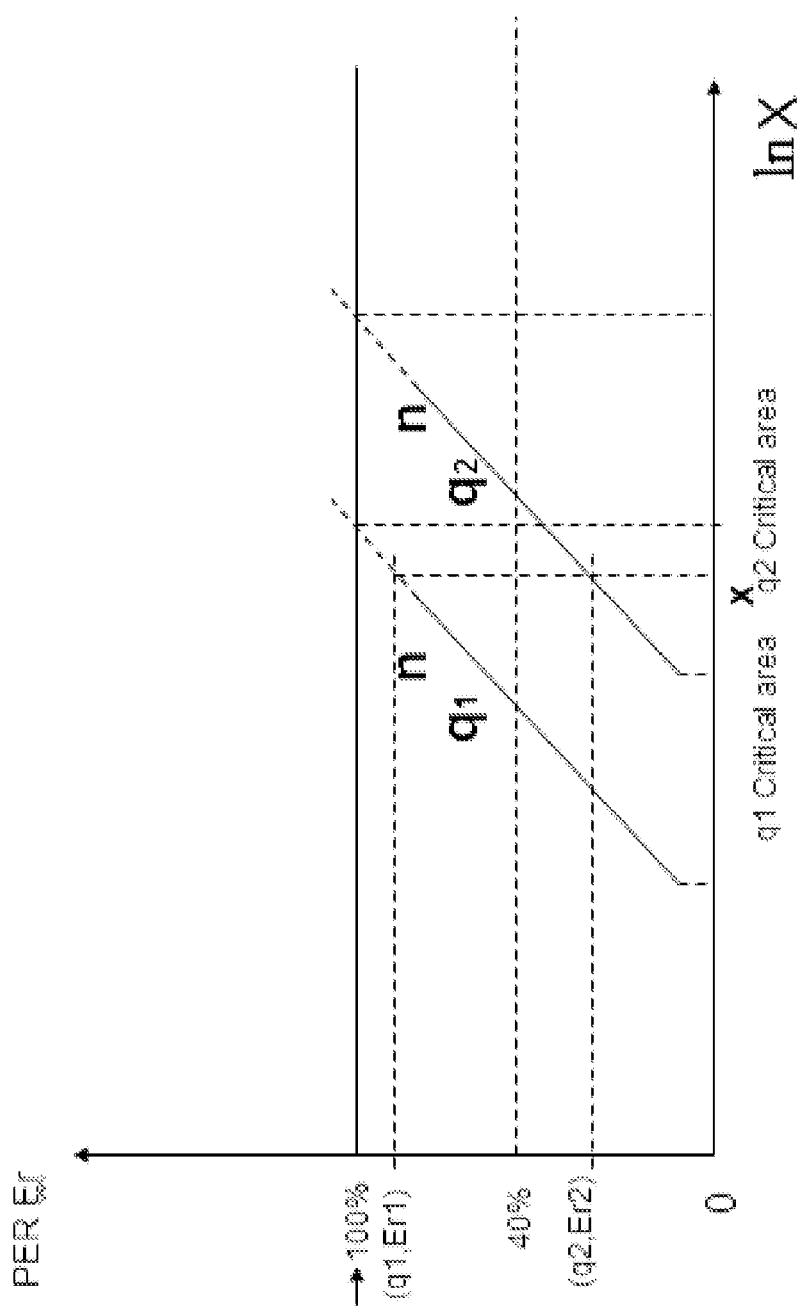
FIG. 3 is a schematic view showing the position of critical transition area when the active RFID tag works at different transmit powers.
Figure 4:
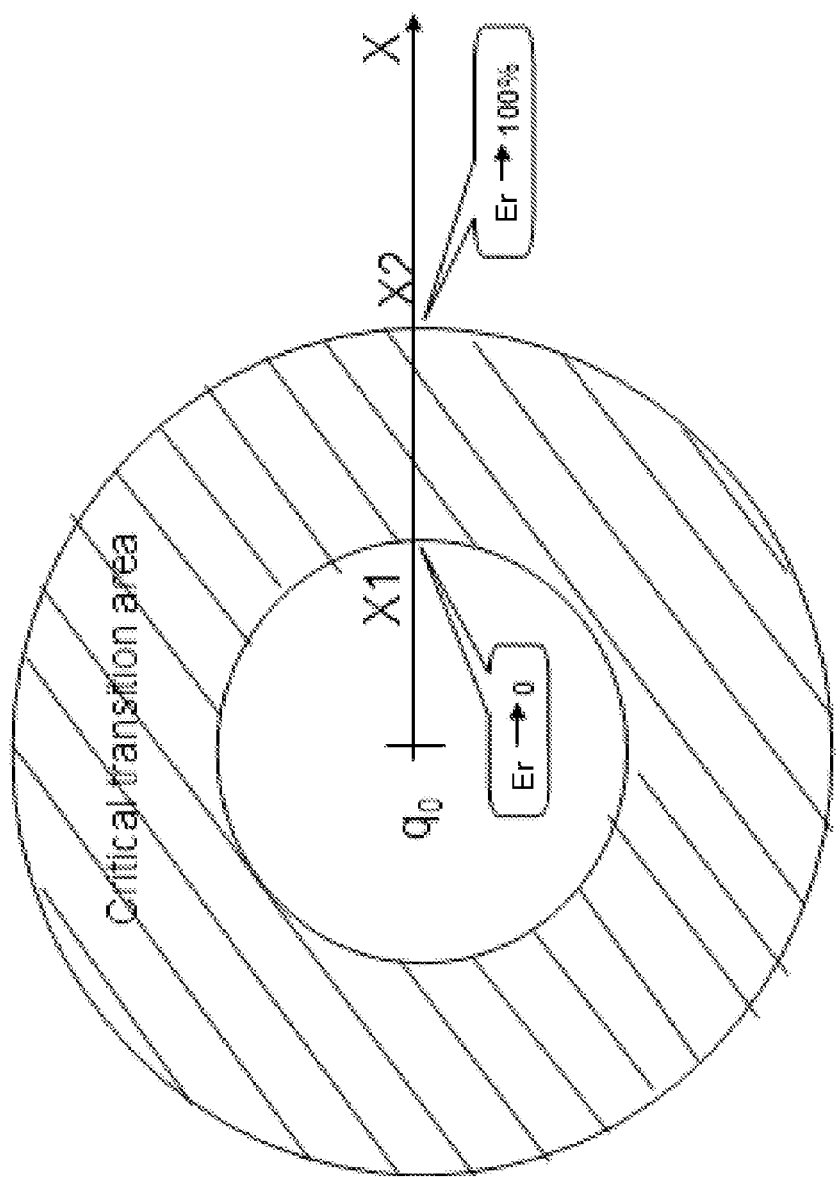
FIG. 4 is a schematic view showing critical transition areas corresponding to each given signal transmit power and receiver flexibility of the active RFID tag.

The signal source can transmit ranging signals at different transmit powers. For example, in the formula ln x={ln q−ln g(Er)−b(N)}/n, the same position x may correspond to different groups of values of q and Er, as shown in FIG. 3. It is recommended that the group of values where the PER is most close to the middle value within the range of 1%-99%, or the group of values corresponding to the critical transmit power are used to reduce the error.

During the positioning test, the signal source for example, the active RFID tag (or RFID tag), uses different transmit powers to transmit ranging signals to firstly search out the critical transmit power corresponding to the RFID tag. When the active RFID tag transmits signals at this transmit power, the PER in signal receiving by the signal receiver (for example, active RFID reader) is most sensitive to the change of the distance between the active RFID tag and the active RFID reader. To be specific, when the active RFID uses a greater transmit power to transmit signals, the PER sharply decreases to be close to 0% and becomes insensitive to the above-mentioned distance change. When the active RFID uses a smaller transmit power to transmit signals, the PER sharply increases to be infinite and receives no signals, and in such a case, therefore, the PER is insensitive to the above-mentioned distance change. When the active RFID tag uses the critical transmit power to transmit signals, the signal receiver is covered within its critical signal receiving area. Within this range, when the PER becomes sensitive to the change of the distance between the signal receiver and the active RFID tag (see FIGS. 3 and 4). Therefore, the test result is more accurate. If the PER 40% is defined to the central position in the critical signal receiving area, the transmit power where the PER is closest to 40% can be taken as the critical transmit power to be determined when signals are transmitted at different transmit powers and the PER corresponding to each transmit power is obtained. The distance between the active RFID tag and the active RFID reader is calculated using the pre-determined relationship between the transmit power, corresponding PER, and distance, and the PER tested when the signals are transmitted at the transmit power.

In the practice, the signal transmission mode can be changed for the active RFID tag according to actual conditions to reduce the working time of the active RFID tag to reduce energy consumption. For example, when the active RFID tag covers a larger area, the active RFID tag can be set to transmit signals at multiple transmit powers. The number of signal packets transmitted at each transmit power needs to be, for example, 3-5. After the critical transmit power is determined, the active RFID tag transmit multiple signal packets at the critical transmit power to calculate a more accurate PER. If the distance range between the active RFID tag and the active RFID reader is pre-determined, a more accurate PER corresponding to the critical transmit power can be directed obtained, after multiple signal packets are transmitted continuously at two to three transmit powers close to the corresponding critical transmit power, to calculate the distance between the active RFID tag and the active RFID reader.

The following section describes the technical solution provided in the present invention in combination with embodiments.

Figure 5:
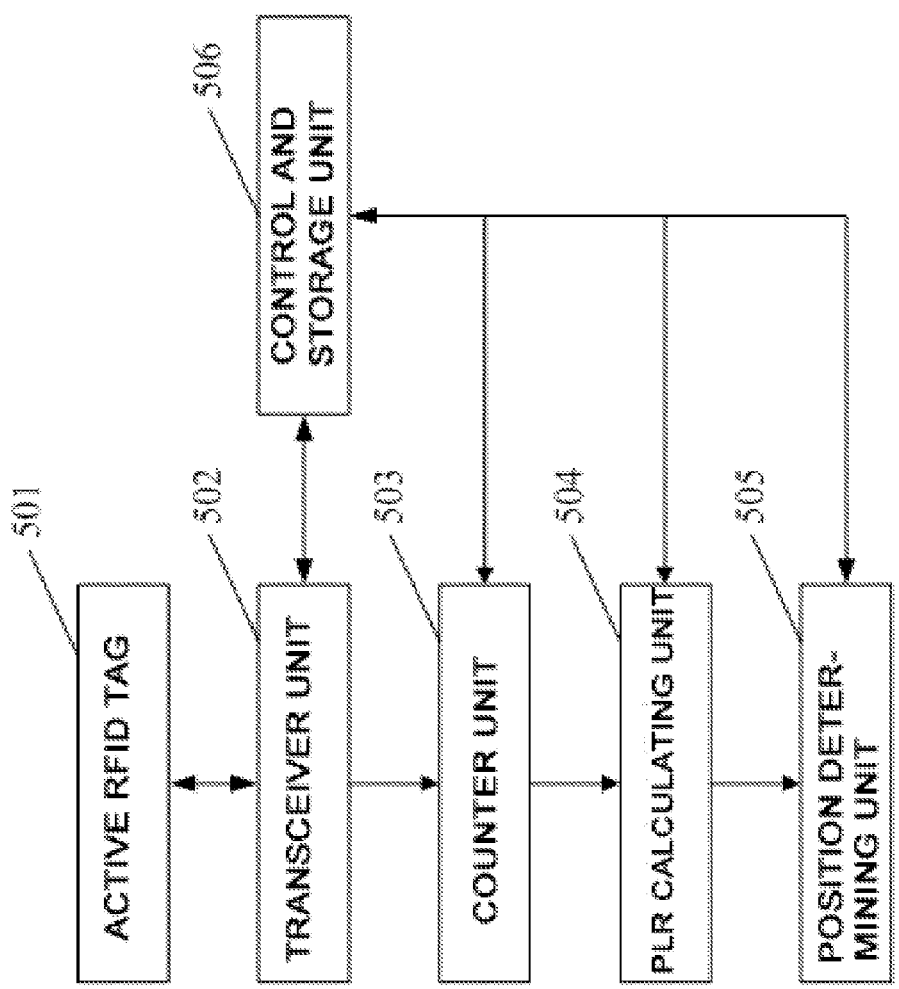
FIG. 5 is a unit structure view showing a system for positioning using the active FRID tag according to an embodiment of the present invention.

As shown in FIG. 5, a system for positioning using an active RFID tag according to an embodiment of the present invention includes:

an active RFID tag 501, configured to continuously and repeatedly transmit a predetermined number of ranging signal packets;

a transceiver unit 502, configured to receive the ranging signals from the active RFID tag;

a counter unit 503, connected to the transceiver unit 502 and configured to count the ranging signal packets received from the transceiver unit 502 within a predetermined time period;

a PLR calculating unit 504, configured to calculate the PLR of the ranging signals according to the number of received ranging signal packets received by the ranging signal collecting unit and the predicated number of data packets transmitted by an active RFID tag within a predetermined time period; and a position determining unit 505, configured to determine, based on a predetermined policy (concluded formula), the position of the active RFID tag according to the PLR and transmit power of the ranging signals;

a control and storage unit 506, configured to control the communication between the transceiver unit 502 and the active RFID tag 501, and receive the position information from the position determining unit 505 and store it; and a ranging signal collecting unit comprised of the transceiver unit 502 and the control and storage unit 506, configured to collect ranging signals from a ranging signal transmitting unit, where the ranging signal transmitting unit may be an active RFID tag.

In practice, the above-mentioned units may be integrated to form an active RFID reader and control processor. The transceiver unit forms an active RFID reader, and the counter unit, PLR calculating unit, position determining unit, and control and storage unit may be integrated to form a control processor; or the transceiver unit and counter unit may be integrated to form an active RFID reader, the PLR calculating unit, position determining unit, and control and storage unit may be integrated to form a control processor; or the transceiver unit, counter unit, and PLR calculating unit may be integrated to form an active RFID reader, and the position determining unit and control and storage unit may be integrated to form a control processor; or the transceiver unit, counter unit, and PLR calculating unit, and position determining unit may be integrated to form an active RFID reader, and the control and storage unit forms a control processor.

It should be noted that as regards the preceding integration mode for forming the active RFID reader and control processor, if two or more than two active RFID readers are used to determine the position of the active RFID tag, the position determining unit needs to be integrated into the control processor.

Accordingly, from another aspect, it may be considered that the system for positioning using the active RFID tag includes an active RFID tag, an active RFID reader, and a control processor.

Figure 6:
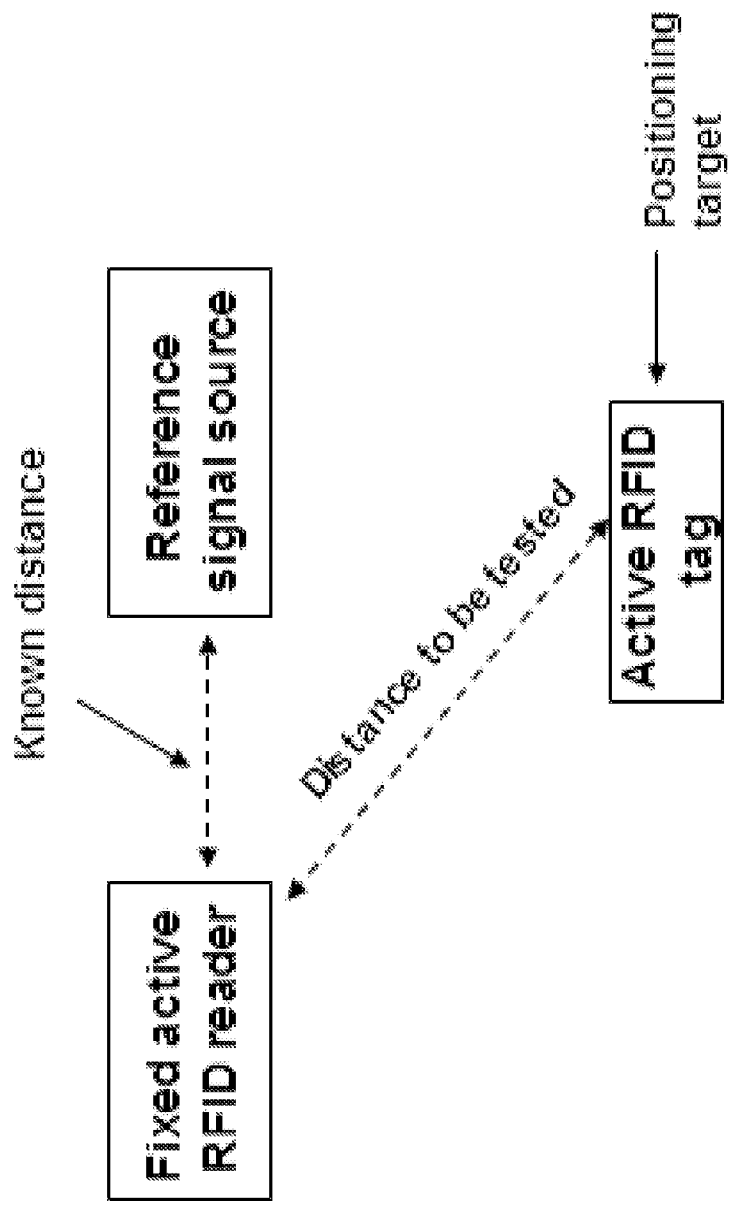
FIG. 6 is a schematic view showing a system for positioning using reference signals according to an embodiment of the present invention.
Figure 9:
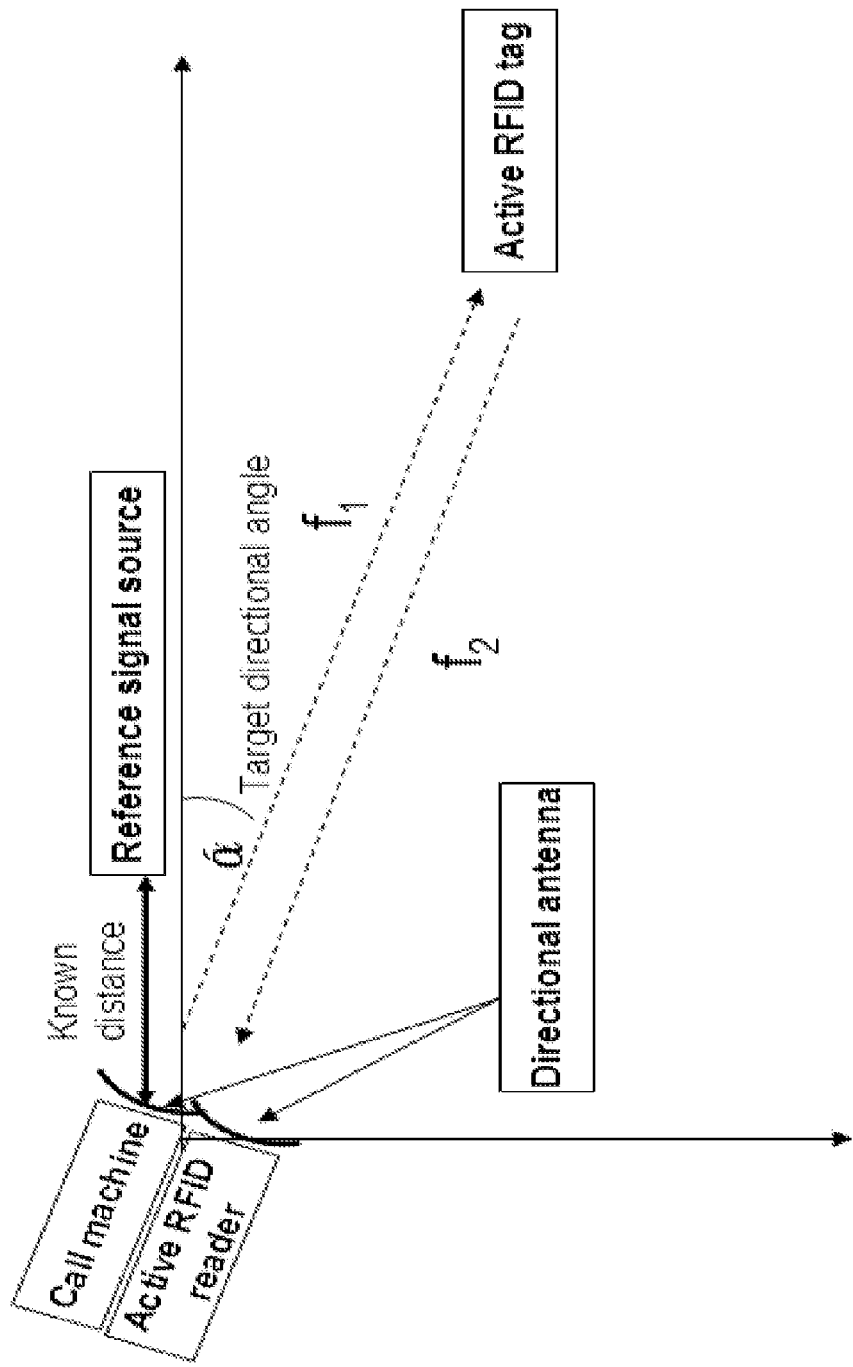
FIG. 9 is a schematic view showing positioning using a directional antenna in a polar coordinate.
Figure 12:
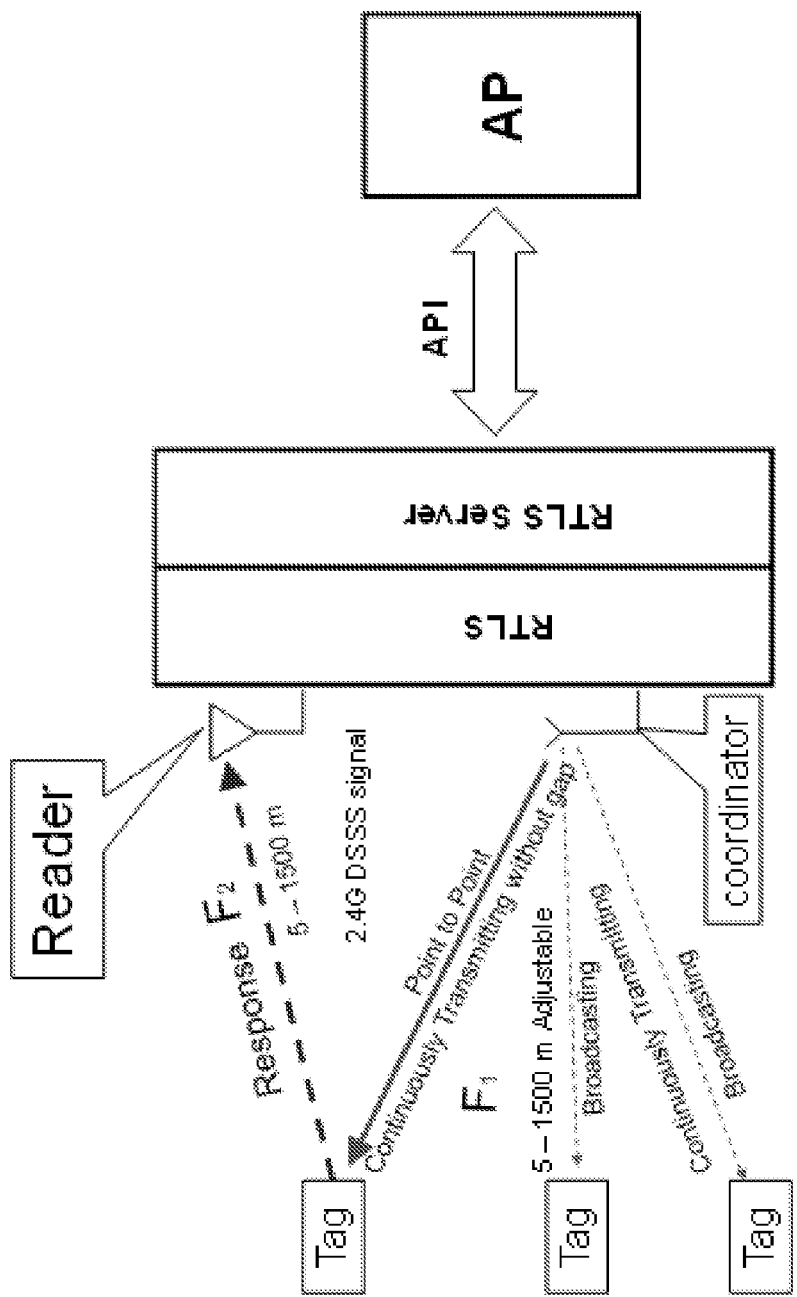
FIG. 12 is a schematic view showing an application example of the active RFID tag in the positioning system according to an embodiment of the present invention, where the coordinator is connected to a control process (network and control computer in the figure); the coordinator may be also independent of the control processor.

In addition, the system may also includes:

a reference signal source (as shown in FIG. 6), configured to correct b(N) in the preset policy to reduce the impact from the ambient noise changes to positioning of the active RFID tag and ranging signal transmitting unit, according to the preset x and q values at the reference signal source when positioning the active RFID tag and ranging signal transmitting unit;

a directional antenna (as shown in FIG. 9), configured to receive or transmit signals, and determine the direction of the active RFID tag according to the direction of the antenna;

a coordinator or call machine (as shown in FIG. 12), configured to transmit wakeup signals continuously on a wakeup channel (channel F1); upon receiving the wakeup signals, the active RFID tag receives the wakeup signals after waking up from a periodical dormant state in the interception time period, and switches to channel F2 to transmit ranging signals to the active RFID reader; or the active RFID tag changes its working mode or transmits signals in a set transmission node according to command for the working mode of the active RFID tag and the ranging signal transmission mode contained in the wakeup signals.

The active RFID tag is further configured to transmit call signals to the transceiver unit, and transmits the ranging signals according to the command signals received through the (transceiver unit in) the coordinator from the control processor.

The active RFID tag is generally (but not limited to be) formed by a micro-wave single-chip transceiver and a single-chip microcomputer. The micro-wave single-chip transceiver and the single-chip microcomputer may be integrated on one chip. The active RFID tag's transmit power can be adjusted by software or other methods. It is generally powered by the battery and carried by the target to be positioned. Considering energy saving, the active RFID tag can be made to work alternatively in the working and standby states. The active RFID tag stays in the standby state with low power consumption most of the time. It enters the working state for a short time period only after receiving wakeup signals or call signals when it is required to work. After finishing a task, it quickly returns to the standby state. In the standby state, the active RFID tag periodically stays in the dormant state or interception state. When it is in the dormant state, the crystal oscillator and frequency synthesizer are all disabled, consuming less power. When it is in the interception state, the crystal oscillator and frequency synthesizer are enabled. The instant low power consumption state when the active RFID tag periodically enter the dormant state and wakes up and intercepts signals on the first channel is called standby state, which is a basic state that the active RFID tag can maintain for a long time. When receiving the wakeup signals from the coordinator, the active RFID tag switches to the working channel and communicates with the RFID reader, or performs other operations according to commands, which is called the working state. This is a high power consumption state that the RFID tag can maintain for a short time period. In case of no consideration on energy saving, the working mode of the active RFID is more flexible, and it can be always in the working state for receiving or transmitting signals. The communication distance between the active RFID tag and active RFID reader ranges between 0.1 m and 2000 m.

The active RFID reader is connected to the control processor, and is a signal transceiver that can communicate with the active RFID tag and reference signal source. The active RFID reader has a relatively fixed position and is generally powered by an external power supply. When necessary, it also provides the RSSI function.

The control processor is generally a computer, and is connected to the active RFID reader. It can control the active RFID reader, store, and process various data required for positioning.

The reference signal source is an active RFID tag or another RFID reader. The distance between the reference signal source and the given RFID reader is pre-determined. It should be noted that the active RFID tag or active RFID reader, as the reference signal source, needs to have the same or similar working feature in signal transmission as or to the active RFID tag carried by the target. The reference signal source is mainly used to correct the actual positioning test, that is, correct b(N), when the change of the ambient noise produces impacts on the test results. In addition, other parameters reflecting ambient noise changes, such as the RSSI value (N) tested when the active RFID reader is receiving signals, can also be used to correct b(N).

The coordinator is a common signal transmitter, which is generally powered by an external power supply and collaborates with the active RFID reader to work. It uses an interception instance after the active RFID periodically wakes up from the dormant state to transmit command signals to the active RFID tag to adjust its working state. In this manner, the active RFID is energy saving and carries out information exchange with the RFID reader for positioning according to actual requirements. Accordingly, the coordinator usually works on different channels from the active RFID reader. It may be arranged with the active RFID reader at either the same position or different positions (see FIGS. 7 and 9).

The following section uses the active RFID reader formed by the transceiver unit, counter unit, and PLR calculating unit, and the control processor formed by the position determining unit and control and storage unit as examples to describe the embodiments.

As regards positioning of the active RFID tag in a one-dimensional space, for example, positioning and rescue of workers in the underground mine, the workers can be positioned if the active RFID tags carried by the workers or one active RFID tag fixedly arranged in the mine tunnel is detected, or the distance between two active RFID readers are measured. The active RFID reader may be arranged at the entrance of each positioning section.

According to the first embodiment of the present invention, only one active RFID reader is arranged. For example, in the 1000-meter-deep straight tunnel, the active RFID reader and coordinator are arranged at the entrance of the mine, a reference signal source is arranged at a position, for example 300 meters, away from the active RFID reader, and the works enter the mine tunnel carrying active RFID tags. Referring to FIG. 6, the position of the reference signal source is for illustration only. In a one-dimensional space, the reference signal source, active RFID tag, and active RFID reader are arranged on the same straight line or on a known curve; whereas in a two-dimensional space, that is, planar space, the reference signal source may be not arranged on the straight line where the active RFID tag and active RFID reader are arranged (except the case where the directional antenna is used).

Step 1: When a worker carrying the active RFID tag needs to be positioned, use the reference signal source or the noise strength N tested on-site to correct b(N) in the formula ln x=[ln q−G(Er)−b(N)]/n. Specifically, the reference signal source transmit ranging signals at a position that is x meters, for example 300 meters away from the active RFID reader. The active RFID reader receives the ranging signals, counts the signals received within a pre-determined time period, and determines the pre-stored PLR Er according to the number of ranging signals transmitted by the reference signal source within the pre-determined time period. For example, within 1 ms, the reference signals source transmits 100 signal packets, but actually 55 signal packets are received. Therefore, 45 signal packets are lost and the PLR is 45%. The reference signal source is arranged at a position where the PLR is close to the middle value within the range of 1%-99%. g(Er) corresponding to the PLR Er is determined and G(Er) is thus determined according to the pre-determined relationship between the PLR Er and g(Er). The active RFID reader pre-stores the transmit power q of the ranging signals from the reference signal, and n is also pre-determined. Accordingly, x, q, G(Er), and n in the preceding formula are known so that b(N), that is, b(Nnew), in the positioning of the target can be determined to increase test accuracy which is affected by b(N) varying with the ambient noise. In addition, the ranging signals are transmitted at different transmit powers using the reference signal source to determine the PLR Er. The PLR is a preferred PLR corresponding to a transmit power among different transmit powers. With the PLR Er determined, x, q, G(Er), and n can be obtained and thus b(Nnew) can be determined. This will be described in the following section.

Step 2: A coordinator (not shown in FIG. 6) continuously and repeatedly transmits wakeup signals to the active RFID tag on the wakeup channel (channel F1).

The coordinator may be connected to or separate from the control processor. It may transmit wakeup signals under control of the control processor or transmit wakeup signals according to a pre-determined process.

Figure 7:
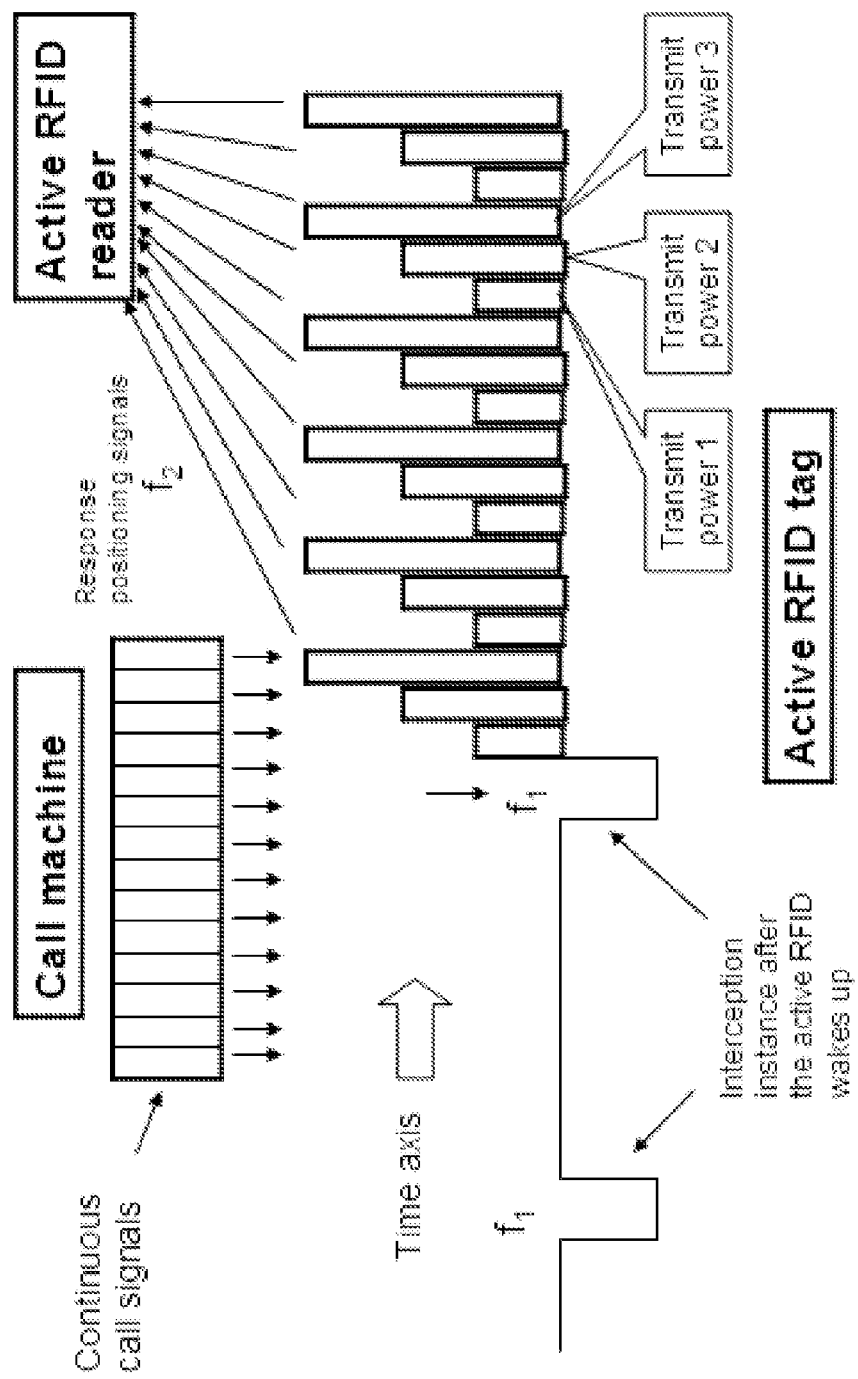
FIG. 7 is a schematic view showing that the active RFID tag switches to a second channel to transmit multiple groups of ranging signals at different transmit powers upon receiving wakeup signals on a first channel.

Step 3: The active RFID tag in the standby state receives the wakeup signals on the wakeup channel, switches to the working channel (channel F2), and transmits ranging signals to the active RFID reader in a pre-determined ranging signal transmission mode within the interception time period or transmits ranging signals in the specified ranging signal transmission mode according to the information contained in the wakeup signals that is used for controlling the mode for the active RFID tag to transmit ranging signals (as shown in FIG. 7).

No matter the ranging signal transmission mode is pre-determined or specified, signals can be transmitted to the active RFID reader at different transmit powers Specifically, a pre-set number of ranging signals are continuously transmitted at each transmit power by turn. The power grade can be multiple, which is determined by the feature of the active RFID tag. A command can be used to set the number of power grades to be used. The number of ranging signals transmitted at each transmit power can be set using a command. For example, as shown in FIG. 7, a ranging signal is transmitted repeatedly and continuously to the active RFID reader at transmit powers 1, 2, and 3 cyclically; or 100 ranging signals are transmitted continuously to the active RFID reader at transmit powers 1, 2, and 3 respectively and repeatedly.

The information, contained in the wakeup signals, for controlling the mode for the active RFID tag to transmit ranging signals may be either commands or action command indexes. Therefore, the active RFID reader can transmit the ranging signals according to the commands, or finds and execute, according to the pre-set mapping between the index and action, the active command corresponding to the action command index to transmit the ranging signals.

Step 4: Upon receiving the ranging signals, the active RFID reader respectively calculate the PLR of the ranging signals transmitted at each transmit powers, and transmit the calculated PLR to the control processor.

Step 5: The control processor select a preferred PLR according to the received PLRs corresponding to different transmit powers, and determine the corresponding transmit powers for transmitting the ranging signals and G(Er).

A preferred PLR refers to a PLR close to the middle value with the range of 1%-99%. A PLR of 40% is preferred.

Referring to FIG. 3, the active RFID reader provides the PER information useful for positioning to the control processor by receiving the PLRs when the active RFID tag and reference signal source transmit a pre-determined number of ranging signals at different transmit powers. The control processor pre-stores the information about the mode for the active RFID tag to transmit ranging signals and the power of the ranging signals transmitted at each transmit power. Therefore, the corresponding power of the ranging signal can be queried according to a preferred PLR. The query method is: the transmit power of the ranging signal with the smallest PLR is corresponding to that of the ranging signal with the largest PLR, and the transmit power of the ranging signal with the second smallest PLR is corresponding to that of the ranging signal with the second largest PLR. In this manner, the transmit power corresponding to the preferred PLR can be determined. For example, as regards the ranging signals with six different transmit powers, the active RFID reader calculates the PLRs, 1, 1, 87%, 45%, 10%, and 0. If the preferred PLR is 45%, the corresponding transmit power of the ranging signal with this PLR is the grade-4 power from large to small. Then, g(Er) corresponding to the preferred PLR can be determined according to the preferred PLR and the relationship between Er and g(Er), and G(Er) is determined according to the formula G(Er)=ln g(Er). n is pre-determined.

Step 6: According to the formula ln x=[ln q−G(Er)−b(Nnew)]/n, where b(Nnew), q, G(Er), and n are known, the distance between the active RFID tag and active RFID reader can be calculated to determine the position of the target, that is, the position of the active RFID tag or the worker carrying the active RFID tag in the mine.

According to the second embodiment of the present invention, two active RFID readers are arranged in the straight mine tunnel, with positioned known, which are represented by active RFID reader 1 and active RFID reader 2. The method described in the first embodiment can be used to calculate a preferred PLR $Er_1$ for the active RFID reader 1 (the transceiver unit 1 corresponding to the active RFID reader 1) to determine $q_1$ and $g(Er_1)$; calculate a preferred PLR $Er_2$ for the active RFID reader 2 (the transceiver unit 2 corresponding to the active RFID reader 2) to determine $q_2$ and $g(Er_2)$; and calculate the distances $x_1$ and $x_2$ between the active RFID tag and the active RFID reader 1 (transceiver unit 1) and active RFID reader 2 (transceiver unit 1) respectively according to the formula $\ln x=[\ln q-G(Er)-b(Nnew)]/n$ ($\ln x=[\ln q-G(Er)-b(N)]/n$ if $b(N)$ does not need to be corrected). Accordingly, the position of the active RFID tag is determined.

Figure 8:
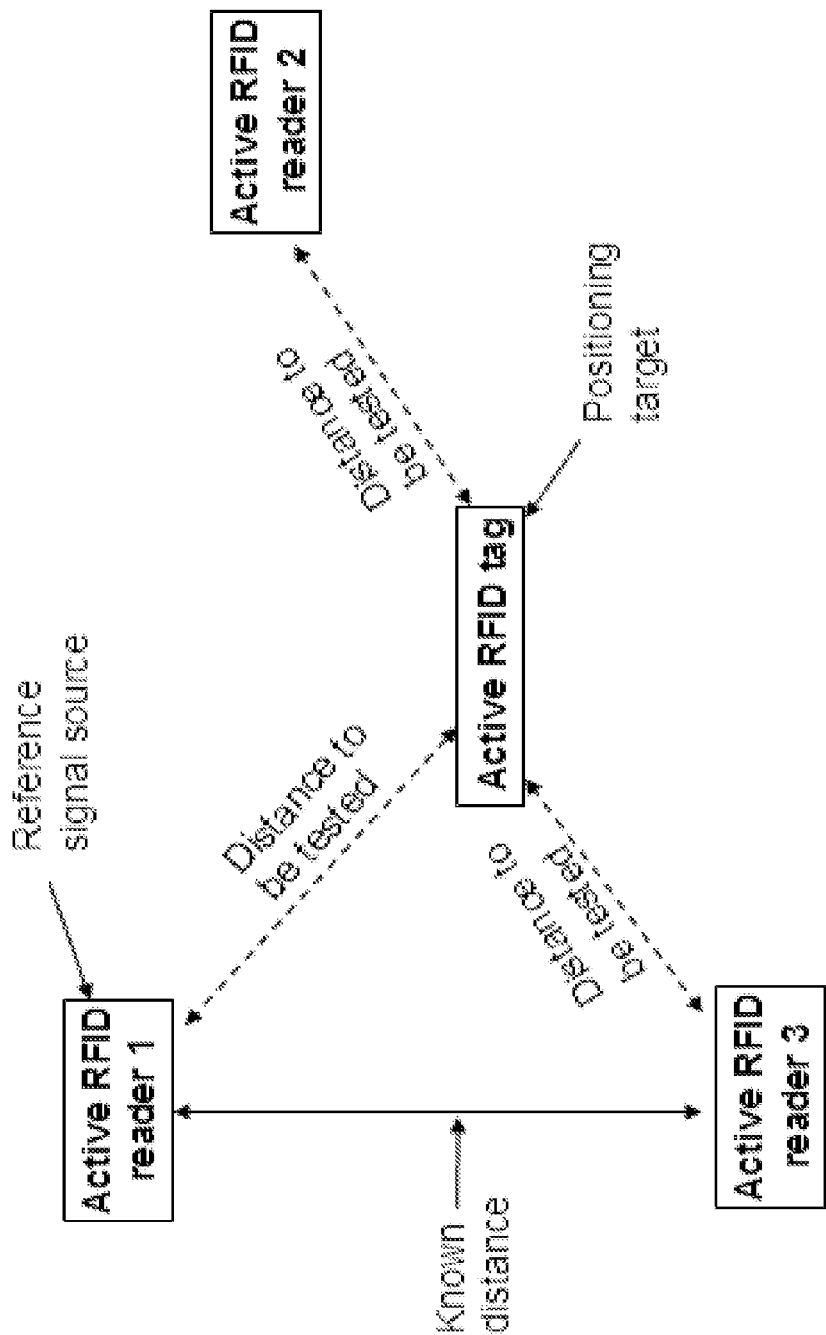
FIG. 8 is a schematic view showing multi-dimensional positioning using multiple active RFID readers.

According to the third embodiment of the present invention, referring to FIG. 8, three active RFID readers are arranged in a planar space, with positions known, represented by active RFID reader 1, active RFID reader 2, and active RFID reader 3. The method described in the first embodiment can be used to calculate a preferred PLR $Er_1$ for the active RFID reader 1 (the transceiver unit 1 corresponding to the active RFID reader 1) to determine $q_1$ and $g(Er_1)$; calculate a preferred PLR $Er_2$ for the active RFID reader 2 (the transceiver unit 2 corresponding to the active RFID reader 2) to determine $q_2$ and $g(Er_2)$; calculate a preferred PLR $Er_3$ for the active RFID reader 3 (the transceiver unit 3 corresponding to the active RFID reader 3) to determine $q_3$ and $g(Er_3)$; and calculate the distances $x_1$, $x_2$, and $x_3$ between the active RFID tag and the active RFID reader 1 (transceiver unit 1), active RFID reader 2 (transceiver unit 1), and active RFID reader 3 (transceiver unit 3) respectively according to the formula $\ln x=[\ln q-G(Er)-b(Nnew)]/n$ ($\ln x=[\ln q-G(Er)-b(N)]/n$ if $b(N)$ does not need to be corrected). Accordingly, the position of the active RFID reader in the planar space is uniquely determined.

The control processor (a control processing unit in) transmits the determinate position information about the active RFID tag through the active RFID reader (transceiver unit in) to the active RFID tag or transmits the PLR or the number of received ranging signals within the predetermined time period to the active RFID tag. The active RFID tag determines its own position according to the saved in advance formula (or called predetermined policy).

According to the fourth embodiment of the present invention, as regards a target in a three-dimensional space, the positioning of a target carrying the active RFID tag, referring to FIG. 9, the system for positioning the active RFID tag includes: an active RFID tag, control processor, coordinator, reference signal source, directional antenna 1, and directional antenna 2.

Step 1: Use the reference signal source to correct $b(N)$ in the formula $\ln x=[\ln q-G(Er)-b(N)]/n$ to determine $b(Nnew)$, referring to the description of the first embodiment.

Step 2: The coordinator continuously sends wakeup signals to the active RFID tag in different direction on a wakeup channel (channel F1) by rotating the directional antenna 1.

Step 3: When the directional antenna rotates to the direction of the active RFID tag, the active RFID tag in the standby state receives wakeup signals from the coordinator on the wakeup channel with the interception time period. Upon receiving the wakeup signals, the active RFID tag switches to the working channel (channel F2) immediately to transmit the ranging signals in the pre-determined ranging signal transmission mode, or transmits the ranging signals in the pre-determined ranging signal transmission mode according to the information contained in the wakeup signals that is used for controlling the mode for the active RFID tag to transmit ranging signals.

Step 4: Upon receiving these ranging signals by the directional antenna 2, the active RFID reader determines the direction of the active RFID tag, and calculates the PLR of the ranging signals transmitted at each transmit power and transmits to the control processor.

It should be noted that the directional antenna 1 connected to the coordinator and the directional 2 connected to the active RFID reader always point to the same direction; the directional antenna 1 only transmits the wakeup signals, while the directional antenna 2 can not only receive signals, for example, receive ranging signals, but also transmit signals, but signal receiving and transmitting need to be carried out at different moments. The active RFID reader receives the ranging signals through the directional antenna 2 only when the active RFID tag is in the direction of the directional antenna. Therefore, the directional antennas 1 and 2 determine the direction of the active RFID tag according to the direction of the ranging signals.

Step 5: According to the received PLRs corresponding to different transmit powers, the control processor selects a preferred PLR, determines the transmit power of the ranging signal according to the preferred PLR, and determines $g(Er)$ corresponding to the preferred PLR q according to the pre-determined relationship between $E(r)$ and $g(Er)$. Refer to the method for determining the preferred PLR and $g(Er)$ value described in the first embodiment.

Step 6: According to the formula $\ln x=[\ln q-G(Er)-b(Nnew)]/n$, where $b(Nnew)$, $q$, $G(Er)$, and n are known, the distance x between the active RFID tag and the active RFID reader can be calculated, and the location of the active RFID tag is determined in combination with the direction determined by the directional antenna.

According to the fifth embodiment of the present invention, the system for positioning the active RFID tag in one dimensional space includes: an active RFID tag, control processor, coordinator, and two active RFID readers, active RFID reader 1 and active RFID reader 2, arranged in straight tunnel.

Step 1: The coordinator continuously transmits wakeup signals to the active RFID tag on the wakeup channel (channel F1).

Step 2: The active RFID tag in the standby state receives the wakeup signals on the wakeup channel in the interception time period, and switches to the working channel (channel F2) to transmit the ranging signals to the active RFID tag in the pre-determined ranging signal transmission mode, or transmits the ranging signals according to the information contained in the wakeup signals that is used for controlling the mode for the active RFID tag to transmit ranging signals.

Step 3: Upon receiving these ranging signals, the active RFID reader calculates the PLR of the ranging signals transmitted at each transmit power and transmits the PLR to the control processor.

Step 4: According to the received PLRs corresponding to different transmit powers, the control processor selects a preferred PLR, determines the transmit power of the ranging signal according to the preferred PLR, and determines $g(Er)$ corresponding to the preferred PLR q according to the pre-determined relationship between $E(r)$ and $g(Er)$. Refer to the method for determining the preferred PLR and $g(Er)$ value described in the first embodiment.

As regards the active RFID reader 1 (transceiver unit 1 corresponding to the active RFID reader 1), a preferred PLR $Er_1$, transmit power $q_1$ of the ranging signals corresponding to $Er_1$, and $g(Er_1)$ can be determined. As regards the active RFID reader 2 (transceiver unit 2 corresponding to the active RFID reader 2), a preferred PLR $Er_2$, the transmit power $q_2$ of the ranging signals corresponding to $Er_2$, and $g(Er_2)$ can be determined.

Step 5: According to the formula $x_1/x_2=[q_1 g(Er_2)/q_2 g(Er_1)]^{1/n}$, where $x_1$ and $x_2$ are the distances respectively between the active RFID tag and transceivers units 1 and 2 whose positions are pre-determined, n is a predetermined environment attenuation index. The control processor can determine the ratio of the distance between the active RFID tag and the active RFID reader 1 to the distance between the active RFID tag and the active RFID reader 2.

According to the sixth embodiment of the present invention, as regards the positioning of the active RFID tag in a two-dimensional space (planar space), three active RFID readers are arranged on the planar space, with positions known, which are represented by active RFID reader 1, active RFID reader 2, and active RFID reader 3.

The method described in the fifth embodiment can be used to calculate a preferred PLR $Er_1$ for the active RFID reader 1 (the transceiver unit 1 corresponding to the active RFID reader 1) to determine $q_1$ and $g(Er_1)$; calculate a preferred PLR $Er_2$ for the active RFID reader 2 (the transceiver unit 2 corresponding to the active RFID reader 2) to determine $q_2$ and $g(Er_2)$; and calculate a preferred PLR $Er_2$ for the active RFID reader 3 (the transceiver unit 2 corresponding to the active RFID reader 3) to determine $q_3$ and $g(Er_3)$.

According to the formula $x_1/x_2=[q_1 g(Er_2)/q_2 g(Er_1)]^{1/n}$ and the derived formula $x_2/x_3=[q_2 g(Er_3)/q_3 g(Er_2)]^{1/n}$, the following formula can be derived:

$$x_1/x_2/x_3=[(q_1 g(Er_2)g(Er_3))/(q_2 g(Er_1)g(Er_3))/(q_3 g(Er_1)g(Er_2))]^{1/n}$$

In the preceding formula, $x_1$, $x_2$, and $x_3$ are the distances respectively between the active RFID tag and the active RFID readers (or transceiver units corresponding to the active RFID readers) 1, 2, and 3 whose positions are pre-determined. Accordingly, the position of the active RFID tag is determined.

According to the seventh embodiment of the present invention, as regards the positioning of the active RFID tag in a three-dimensional space, the method for positioning the active RFID tag described in the fourth embodiment and the method for positioning the active RFID tag by calculating the ratio of the distance between the active RFID tag and active RFID reader 1 to the distance between the active RFID tag and active RFID reader 2 can be referred to.

The positioning system includes: a coordinator, active RFID tag, active RFID reader 1, active RFID reader 2, directional antenna 1, and directional antenna 2. The positions of the active RFID readers 1 and 2 are known. The coordinator is connected to the directional antenna 1 and transmits wakeup signals through the directional antenna 1; the active RFID reader 2 (or active RFID reader 1) is connected to the directional antenna 2, and receive signals, for example, ranging signals, through the directional antenna 2. The directional antennas 1 and 2 always point to the same direction.

When receiving the ranging signals from the active RFID tag, reader 2 determines the direction of the active RFID tag according to the direction the directional antenna 2 points to; and determines the ratio of the distance between the active RFID tag and active RFID reader 1 to the distance between the active RFID tag and active RFID reader 2 according to the ranging signals received respectively from the active RFID readers 1 and 2.

$$x_1/x_2=[q_1 g(Er_2)/q_2 g(Er_1)]^{1/n},$$

Accordingly, the control processor determines the position of the active RFID tag according to the direction and value $x_1/x_2$.

Figure 10:
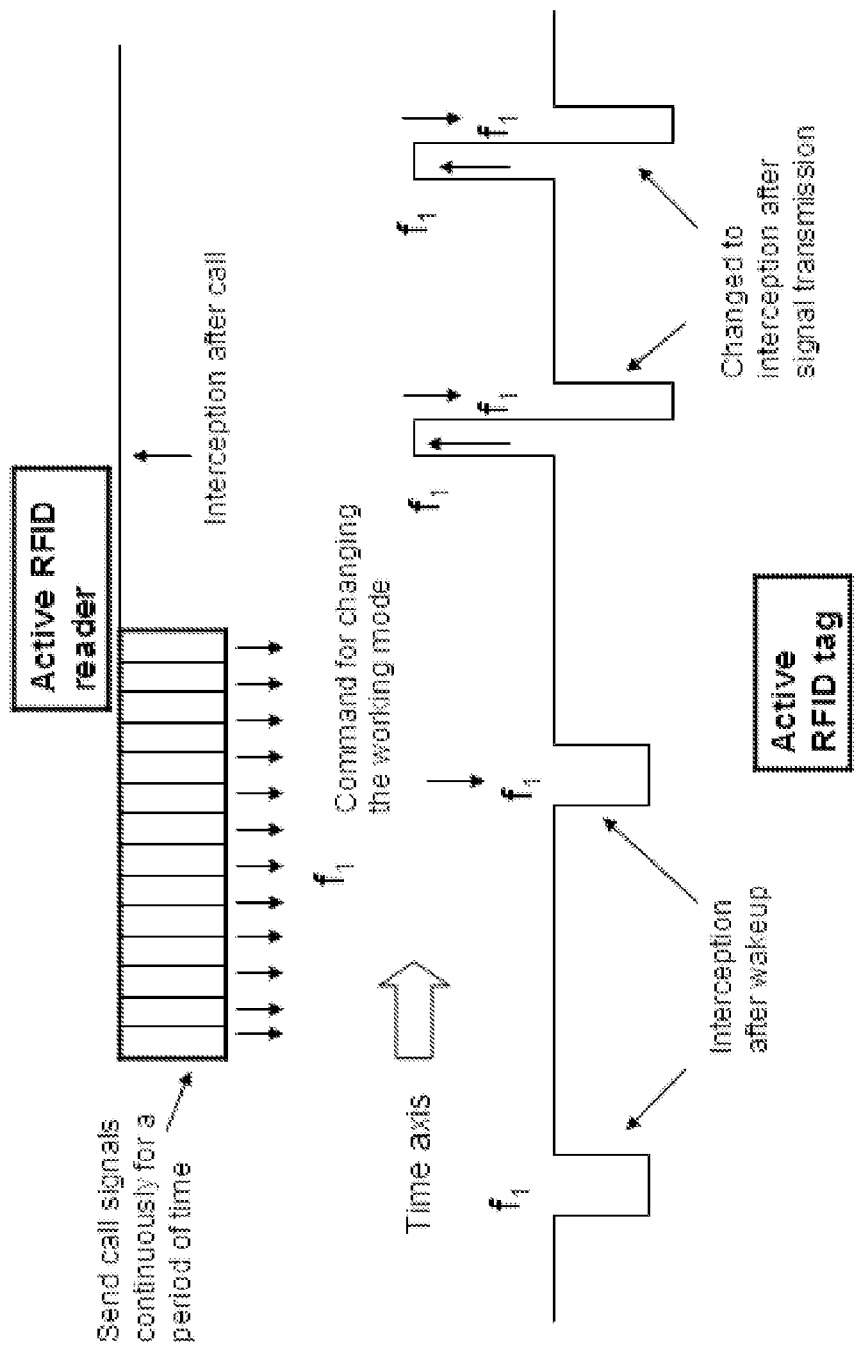
FIG. 10 is time sequence diagram of signal control in a positioning system using the active RFID tag and RFID reader without a coordinator, where the active RFID tag works in interception-prioritized mode, and changes to transmitting-first-and-then-intercepting mode upon receiving call signals to determine whether the active RFID reader enters the interception mode but still works on the same channel.
Figure 11:
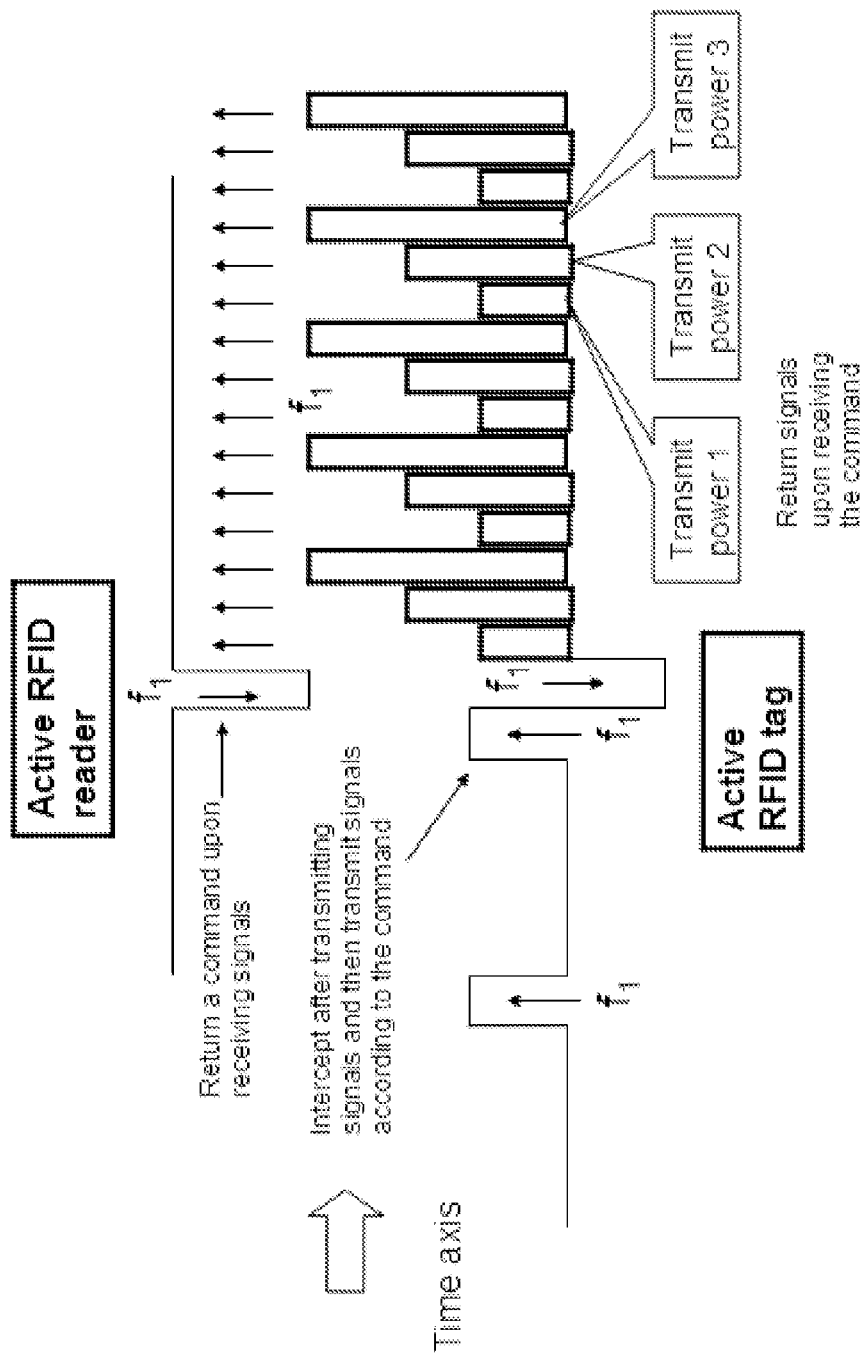
FIG. 11 is a schematic view showing that the active RFID tag, after entering the transmitting-first-and-then-intercepting mode as shown in FIG. 10, transmits ranging signal packets according to a command received from the active RFID reader.

According to the eighth embodiment of the present invention, the positioning system consists of an active RFID tag and active RFID reader, as shown in FIGS. 10 and 11.

Step 1: The active RFID reader continuously transmits call signals to the active RFID tag on a wakeup channel (channel F1) for a specific period and then switches to the signal receiving state.

The duration for continuously transmitting call signals should be at least longer than the dormancy-interception time period the active RFID tag to ensure that the active RFID tag has at least one chance to intercept the call signals when the active RFID reader transmits call signals.

Step 2: The active RFID tag in the standby state receives the call signals on the wakeup channel in the interception time period, and switches to the working mode according to the command information included in the call signals, for example, directly sending to the ranging signals after waiting for a specific period (the period at least longer than the duration for transmitting call signals of the active RFID reader to ensure that the active RFID reader entering the signal receiving state) or switching to the working modes for periodically transmitting request signals and receiving returned command signals. The active RFID tag periodically transmits request signals to the active RFID reader on the wakeup channel (channel F1).

The command signals can include the ID of the active RFID tag. If the active RFID tag transmits request signals but active RFID reader does not switch to the signal receiving state, the active RFID reader cannot receive the request signals from the active RFID reader.

Step 3: Upon receiving the command signals, the active RFID reader transmits returned signals to the active RFID tag on the wakeup channel (channel F1).

Upon switching to the signal receiving state, the active RFID reader can receive the request signals sent by the active RFID tag periodically.

Step 4: The active RFID tag receives returned command signals upon transmitting request signals, and transmits ranging signals in a specified mode according to the receiving returned command signals, or switches to the standby state.

Step 5: The active RFID reader receives the ranging signals and determines the position of the active RFID tag.

The active reader here can be one or multiple so that the position of the active RFID tag in one-dimensional and two-dimensional spaces is implemented, referring to the first, second, third, fifth and sixth embodiments, which are not detailed here. The position of the active RFID tag in the three-dimensional space can be implemented in combination with the directional antenna, referring to the fourth and seventh embodiments.

The following section describes an application example of the RFID in vehicle management.

The conventional RFID technology used for vehicle management is categorized into passive RFID and active RFID. As regards the multiple-passage electronic toll collection system (ETC) or other non-stop crossing-gate vehicle management system, no matter the passive RFID or active RFID is used, the problem is to prevent signal misreading by identifying that the vehicle radio frequency identity received by each RFID reader is the vehicle identity signal the system should process rather than signals transmitted by vehicles on the neighboring driveways or the following vehicles far away from the toll gate. Accordingly, the RFID reader arranged in the passage, in addition to restricting the signal transmission direction using the directional antenna, restricts coverage of the signals to prevent signal misreading. Therefore, the signal coverage of the RFID reader is narrowed down. Vehicle speed needs to be lowered when passing through the toll gate to ensure that the RFID reader has sufficient time to receive and process signals. Low vehicle speed definitely reduces the usage efficiency of the highway.

Using the technical solution provided in the present invention can easily solve the technical problem. To be specific, the accurate distance between the active RFID tag and each active RFID reader or the impact caused by the environment interference on the precision is not concerned. With this technical solution, the interference signals transmitted by vehicles on the neighboring driveways or following vehicles far from the toll gate only need to be shielded. In other words, it is only necessary to determine that RFID reader that the RFID tag actually passes through is the nearest one among all RFID readers that the active RFID tag passes through and that receive the signal transmitted by the RFID tag. Accordingly, a reference signal source, a pre-determined transmit power, and relationship between the PER and distance are not required. It is only required that an RFID tag, when getting close to the RFID reader at the toll gate, continuously transmits multiple signal packets at different transmit power close to the critical transmit power. Among all RFID readers that can receive the signal transmitted by the RFID tag, the interference signals transmitted by the vehicles on the neighboring driveways or following vehicles far from the toll gate can be shielded according to the principle that the minimum transmit power and PER corresponds to the minimum distance. When necessary, physical means such as metal plats can be used to increase the different in PER during signal transmission when the RFID readers receive signals transmitted by different RFID tags.

The above are merely exemplary embodiments of the present invention. The scope of the present invention is not limited thereto. Variations or replacements readily apparent to persons skilled in the prior art. Any modification, equivalent replacement, or improvement made without departing from the spirit and principle of the present invention should fall within the scope of the present invention.

What is claimed is:

1. A system for positioning using signal transmit power and signal receive packet error rate (PER), comprising:
    a ranging signal collecting unit, configured to collect ranging signals from a ranging signal transmitting unit, the ranging signal transmitting unit being configured to repeatedly transmit a predetermined number of ranging signal packets within a predetermined time period, wherein the ranging signal transmitting unit is one of an active radio frequency identification (RFID) tag working in intermittent mode in an active RFID tag system and an active RFID reader, and the ranging signal collecting unit is the other of the active RFID tag and the active RFID reader;
    a packet loss rate (PLR) calculating unit, configured to calculate the PLR of the ranging signals according to the number of received ranging signal packets received by the ranging signal collecting unit and the predicted number of data packets transmitted by the ranging signal transmitting unit; and
    a position determining unit, configured to determine, based on a predetermined policy, the distance between the ranging signal transmitting unit and the ranging signal collecting unit according to the PLR and transmit power of the ranging signals;

wherein the predetermined policy is:

$\ln x = [\ln q - G(Er) - b(N)]/n$, where x is the distance between the ranging signal transmitting unit and the ranging signal collecting unit;
q is the transmit power of the ranging signals;
Er is the PLR;
n is an environment attenuation index determined in advance or based on experience;
$b(N) = \ln(N/A)$, where N is the ambient noise strength, and A is signal transmission efficiency parameter of the ranging signal transmitting unit; and
$G(Er) = \ln g(Er)$, where $g(Er)$ is signal to noise ratio (SNR) of the strength of ranging signals received by the ranging signal collecting unit to the ambient noise strength, which is determined according to the mapping between Er and $g(Er)$.

2. The system according to claim 1, wherein the ranging signal collecting unit comprises M transceiver units, where M=1, 2, or 3, wherein the position determining unit determines the distance between the ranging signal transmitting unit and the transceiver unit according to the predetermined policy.

3. The system according to claim 2, further comprising:
    a reference signal source, another active RFID tag or another ranging signal transmitting unit, configured to correct b(N) in the preset policy to reduce the impact from the ambient noise changes to positioning of the active RFID tag and ranging signal transmitting unit, according to the preset x and q values for the another active RFID tag or another ranging signal transmitting unit when positioning the active RFID tag and ranging signal transmitting unit.

4. The system according to claim 3, further comprising:
    a directional antenna, configured to rotate to determine the direction of the ranging signals, and determine the direction of the ranging signal transmitting unit according to the direction of the antenna when receiving the ranging signals.

5. The system according to claim 2, wherein the predetermined policy is:

$x_1/x_2 = [q_1 g(Er_2)/q_2 g(Er_1)]^{1/n}$, where M=2, the corresponding transceiver units are a first transceiver unit and a second transceiver unit;

where $x_1$ and $x_2$ are the distances between the active RFID tag or another ranging signal transmitting unit and the first and second transceiver units with a predetermined position respectively, n is the predetermined environment attenuation index, $Er_1$ and $Er_2$ are respectively the PLRs of the ranging signals at the first and second transceiver units relative to the transmit powers $q_1$ and $q_2$ corresponding to the active RFID tag or another ranging signal transmitting unit, and $g(Er_1)$ and $g(Er_2)$ are determined according to the mapping between the predetermined Er and $g(Er)$; or $x_1/x_2/x_3 = [(q_1 g(Er_2) g(Er_3))/(q_2 g(Er_1) g(Er_3))/(q_3 g(Er_1) g(Er_2))]^{1/n}$, where M=3, the corresponding transceiver units are a first transceiver unit, a second transceiver unit, and a third transceiver unit;

where $x_1$, $x_2$ and $x_3$ are the distances between the active RFID tag or another ranging signal transmitting unit and the first, second, and third transceiver units with a predetermined position respectively, n is the predetermined environment attenuation index, $Er_1$, $Er_2$, and $Er_3$ are respectively the PLRs of the ranging signals at the first, second, and third transceiver unit relative to the transmit powers $q_1$, $q_2$, and $q_3$ corresponding to the active RFID tag or another ranging signal transmitting unit, and $g(Er_1)$, $g(Er_2)$, and $g(Er_3)$ are determined according to the mapping between the predetermined Er and g(Er).

6. The system according to claim 1, wherein the ranging signals are transmitted using multiple transmit powers, the transmission mode being repeatedly transmitting a predetermined number of ranging signal packets using each transmit power in turn; and the calculating the PLR of the ranging signal packets is specifically separately calculating PLR using each transmit power and selecting one from the calculated PLRs.

7. The system according to claim 1, wherein the system further comprises a coordinator, configured to transmit wakeup signals continuously on a first channel for a time period longer or equal to the predetermined time period; and the active RFID tag is further configured to receive the wakeup signals and switch to a second channel to transmit ranging signals within an interception time period.

8. The system according to claim 7, wherein the wakeup signals comprise commands for control and transmission; and the active RFID tag is further configured to change the ranging signal transmission mode according to the commands contained in the wakeup signals.

9. The system according to claim 7, wherein the transmitting the ranging signals is triggered in the mode of:
continuously transmitting, by the coordinator, command signals on the first channel, and transmitting, by the active RFID tag, the ranging signals in a specified transmission mode on the second channel according to the command signals;
before the active RFID tag periodically transmitting the request signals to the active RFID reader, continuously transmitting, by the active RFID reader, the call signals for a time period on the first channel; wherein the active RFID tag is further configured to receive the call signals in the interception time period, and transmit the ranging signals according to the command contained in the call signal on the corresponding channel after the active RFID reader stops transmitting the call signals and starts intercepting the ranging signals on the first channel or other channels; or
before the active RFID tag periodically transmitting the request signals to the active RFID reader, continuously transmitting, by the active RFID reader the call signals for a time period on the first channel; wherein the active RFID tag is further configured to receive the call signals in the interception time period, the active RFID tag, upon receiving the call signals, periodically transmits request signals to the active RFID reader on an interception channel where the active RFID reader is located after stopping transmitting the call signals, and transmits the ranging signals in a specified transmission mode on the interception channel of the active RFID reader according to return command signals subsequently received from the active RFID reader.

10. The system according to claim 1, wherein the active RFID tag is further configured to periodically transmit request signals to the active RFID reader on a first channel, and transmit the ranging signals in a specified transmission mode on the first channel according to return command signals subsequently received from the active RFID reader.

11. The system according to claim 1, wherein the active RFID tag is configured to function as the ranging signal collecting unit, to respectively receive the ranging signals from M active RFID readers functioning as the ranging signal transmitting units and making statistics and simple calculation to enable all active RFID tags to learn their own positions, M being 1, 2, or 3.

12. A method for positioning using signal transmit power and signal receive packet error rate (PER), comprising:
collecting, by a ranging signal collecting unit, ranging signals from a ranging signal transmitting unit, the ranging signal transmitting unit repeatedly transmitting a predetermined number of packets containing the range signals;
calculating, by a packet loss rate (PLR) calculating unit, the PLR of the ranging signals according to the number of received ranging signal packets received by the ranging signal collecting unit and the predicted number of data packets transmitted by the ranging signal transmitting unit within a predetermined time period; and
determining based on a predetermined policy, by a position determining unit, the distance between the ranging signal transmitting unit and the ranging signal collecting unit according to the PLR and transmit power of the ranging signals;
wherein the predetermined policy is:

$\ln x = [\ln q - G(Er) - b(N)]/n$, where x is the distance between the active RFID tag or another ranging signal transmitting unit and the transceiver unit;
q is the transmit power of the ranging signals
Er is the PLR;
n is an environment attenuation index determined in advance or based on experience;
$b(N) = \ln(N/A)$; where N is the ambient noise strength, and A is signal transmission efficiency parameter of the active RFID tag or another ranging signal transmitting unit; and
$G(Er) = \ln g(Er)$, where g(Er) is signal to noise ratio (SNR) of the strength of ranging signals received by the transceiver unit to the ambient noise strength, which is determined according to the mapping between Er and g(Er);
wherein the ranging signal transmitting unit is one of an active RFID tag working in intermittent mode in an active RFID tag system and an active RFID reader, and the ranging signal collecting unit is the other of the active RFID tag and the active RFID reader.

13. The method according to claim 12, wherein the ranging signal collecting unit comprises M transceiver units, where M =2 or 3; and the predetermined policy is:
$x_1/x_2 = [q_1 g(Er_2)/q_2 g(Er_1)]^{1/n}$, where M=2, the corresponding transceiver units are a first transceiver unit and a second transceiver;
where $x_1$ and $x_2$ are the distances between the active RFID tag or another ranging signal transmitting unit and the first and second transceiver units with a predetermined position respectively, n is the predetermined environment attenuation index, $Er_1$ and $Er_2$ are respectively the PLRs of the ranging signals at the first and second transceiver units relative to the transmit powers $q_1$ and $q_2$ corresponding to the active RFID tag or another ranging signal transmitting unit, and $g(Er_1)$ and $g(Er_2)$ are determined according to the mapping between the predetermined Er and g(Er); or $x_1/x_2/x_3 = [(q_1 g(Er_2)g(Er_3))/(q_2 g(Er_1)g(Er_3))/(q_3 g(Er_1)g(Er_2))]^{1/n}$, where M=3, the corresponding transceiver units are a first transceiver unit, a second transceiver unit, and a third transceiver unit;
where $x_1$, $x_2$ and $x_3$ are the distances between the active RFID tag or another ranging signal transmitting unit and the first, second, and third transceiver units with a predetermined position respectively, n is the predetermined environment attenuation index, $Er_1$, $Er_2$, and $Er_3$ are respectively the PLRs of the ranging signals at the first transceiver unit and second transceiver unit relative to the transmit powers $q_1$, $q_2$, and $q_3$ corresponding to the active RFID tag or another ranging signal transmitting unit, and $g(Er_1)$, $g(Er_2)$, and $g(Er_3)$ are determined according to the mapping between the predetermined Er and g(Er).

14. The method according to claim 12, wherein
when the transceiver units can be only arranged on a mobile carrier with limited space, the method comprises: determining the direction of the active RFID tag or another ranging signal transmitting unit using a directional antenna, determining the distance from the active RFID tag or another ranging signal transmitting unit to the mobile carrier according to the received ranging signals, and determining the position of the active RFID tag or another ranging signal transmitting unit in a polar coordinate.

15. The method according to claim 12, wherein
the ranging signals are transmitted using multiple transmit powers, the transmission mode being repeatedly transmitting a predetermined number of ranging signal packets using each transmit power in turn;
the calculating the PLR of the ranging signal packets is specifically separately calculating PLR using each transmit power and selecting one from the calculated PLRs; and
the transmit power used in predetermined policy is a critical transmit power, and the PER is a PER corresponding to the critical transmit power.

16. The method according to claim 12, wherein when there are m active RFID tags or other ranging signal transmitting units and the ranging signals are transmitted to the same transceiver unit using the same transmit power, m=2, 3, . . . i . . . m, i being a natural number greater than or equal to 2, then $x_1/x_{i=[g(Er i)}/g(Er_1)]^{1/n}$, so that the relative distance between the active RFID tag and another ranging signal transmitting unit can be determined using the different PERs of the ranging signals received from the different active RFID tags and ranging signal transmitting units according to the monotone relationship between the PER and SNR and exponential function monotonicity.

* * * * *